(12) United States Patent
Yang

(10) Patent No.: US 11,894,021 B2
(45) Date of Patent: Feb. 6, 2024

(54) DATA PROCESSING METHOD AND SYSTEM, STORAGE MEDIUM, AND COMPUTING DEVICE

(71) Applicant: ALIBABA GROUP HOLDING LIMITED, Grand Cayman (KY)

(72) Inventor: Zhe Yang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 206 days.

(21) Appl. No.: 17/202,751

(22) Filed: Mar. 16, 2021

(65) Prior Publication Data

US 2021/0304796 A1 Sep. 30, 2021

(30) Foreign Application Priority Data

Mar. 30, 2020 (CN) .......................... 202010237158.6

(51) Int. Cl.
*G11B 27/031* (2006.01)
*G11B 27/34* (2006.01)
*H04N 5/272* (2006.01)
*G06V 20/40* (2022.01)

(52) U.S. Cl.
CPC ............ *G11B 27/031* (2013.01); *G06V 20/49* (2022.01); *G11B 27/34* (2013.01); *H04N 5/272* (2013.01)

(58) Field of Classification Search
None
See application file for complete search history.

(56) References Cited

U.S. PATENT DOCUMENTS

| | | |
|---|---|---|
| 5,870,101 A | 2/1999 | Murata et al. |
| 6,215,505 B1 | 4/2001 | Minami et al. |
| 6,621,524 B1 | 9/2003 | Ijima et al. |
| 6,940,526 B2 | 9/2005 | Noda et al. |
| 6,987,535 B1 | 1/2006 | Matsugu et al. |
| 7,432,953 B2 | 10/2008 | Washisu |
| 7,511,730 B2 | 3/2009 | Kondo et al. |
| 7,623,733 B2 | 11/2009 | Hirosawa |
| 7,843,511 B2 | 11/2010 | Kang et al. |
| 8,125,521 B2 | 2/2012 | Itokawa |
| 8,170,752 B2 | 5/2012 | Shimazaki et al. |
| 8,633,994 B2 | 1/2014 | Sasaki |

(Continued)

OTHER PUBLICATIONS

Written Opinion and International Search Report for PCT Application No. PCT/US2021/022509 dated May 27, 2021.

(Continued)

*Primary Examiner* — Gelek W Topgyal

(57) ABSTRACT

A method includes: obtaining video data; receiving a target object; processing the video data to obtain one or more first images of the video data that contain an image of the target object and one or more second images of the video data that do not contain the image of the target object; discarding the one or more second images from the video data; generating a background image based on the one or more second images; synthesizing the one or more first images of the video data with the background image to generate one or more synthesized images; obtaining a target image sequence with the one or more synthesized images based on a time order of the one or more first images in the video data; and displaying each of the one or more synthesized images in the target image sequence in a fade-in and fade-out manner.

20 Claims, 9 Drawing Sheets

(56) References Cited

U.S. PATENT DOCUMENTS

| | | |
|---|---|---|
| 8,941,749 B2 | 1/2015 | Yahata |
| 9,020,241 B2 | 4/2015 | Leichsenring et al. |
| 9,055,277 B2 | 6/2015 | Katayama et al. |
| 9,129,414 B2 | 9/2015 | Hirai et al. |
| 9,241,112 B2 | 1/2016 | Nonaka et al. |
| 9,398,251 B2 | 7/2016 | Choi et al. |
| 9,560,271 B2 | 1/2017 | Na et al. |
| 9,578,260 B2 | 2/2017 | Song et al. |
| 9,877,086 B2 * | 1/2018 | Richardson ........ H04N 21/8456 |
| 10,043,120 B2 | 8/2018 | Lee |
| 10,171,728 B2 | 1/2019 | Shinozaki et al. |
| 10,319,410 B1 * | 6/2019 | Townsend ............. G11B 27/30 |
| 10,334,162 B2 | 6/2019 | Seo et al. |
| 10,623,664 B2 * | 4/2020 | Kawai ...................... G06T 7/11 |
| 10,949,675 B2 * | 3/2021 | Park ......................... H04N 7/18 |
| 10,958,854 B2 * | 3/2021 | Elboher ................. H04N 7/188 |
| 2002/0044603 A1 | 4/2002 | Rajagopalan et al. |
| 2009/0044136 A1 | 2/2009 | Flider et al. |
| 2010/0073475 A1 | 3/2010 | Gibbs et al. |
| 2010/0328452 A1 | 12/2010 | Jung et al. |
| 2014/0153900 A1 * | 6/2014 | Tanaka ................. G11B 27/034 386/239 |
| 2014/0347439 A1 | 11/2014 | Jia et al. |
| 2015/0127626 A1 * | 5/2015 | Park .................... G06F 16/7837 707/706 |
| 2016/0210516 A1 * | 7/2016 | Kim ....................... H04N 7/181 |
| 2016/0323658 A1 * | 11/2016 | Richardson ............ G11B 27/28 |
| 2017/0140541 A1 | 5/2017 | Lu |
| 2019/0251364 A1 * | 8/2019 | Park ......................... G06T 7/20 |
| 2019/0303683 A1 * | 10/2019 | Pearson ................... G06T 7/60 |
| 2020/0143838 A1 * | 5/2020 | Peleg ..................... G11B 27/34 |

OTHER PUBLICATIONS

Tsai et al., "Independent component analysis-based background subtraction for indorr surveillance," IEEE Transaction on image processing 18.1, Nov. 18, 2008.

* cited by examiner

DATA PROCESSING METHOD AND SYSTEM, STORAGE MEDIUM, AND COMPUTING DEVICE

CROSS REFERENCE TO RELATED APPLICATIONS

This application claims priority to and benefits of Chinese Patent Application No. 202010237158.6 filed on Mar. 30, 2020, the content of which is incorporated herein by reference in its entirety.

TECHNICAL FIELD

This specification relates to the field of processing video data, and in particular, to a data processing method and system, a storage medium, and a computing device for processing video data.

BACKGROUND

Currently, surveillance cameras generate a huge amount of video data every day, and the video data usually needs to be stored for recording and viewing history information. However, the solution of storing videos recorded for 24 hours per day has the following disadvantages: all-day video data files are large and occupy large storage space, resulting in an increase in storage costs. There is a large amount of redundant information in the all-day video data, and it takes a long time to browse the all-day video data. The approach thus fails to identify effective information quickly.

For the foregoing problem, no effective solution has been provided yet.

SUMMARY

Embodiments of this specification provide a data processing method and system, a storage medium, and a computing device, to at least resolve a technical problem that a target object cannot be identified quickly due to a large amount of stored video data and a large amount of redundant information in the related art.

According to one aspect of the embodiments of this specification, a data processing method is provided, including: displaying original video data and object information of a target object; and displaying target video data, where the target video data is obtained by synthesizing a target image sequence of the target object and a background image in the original video data, the target image sequence is obtained by processing the original video data based on the object information of the target object, and the background image is included in the original video data and does not include a detection object.

According to another aspect of the embodiments of this specification, a data processing method is further provided, including: displaying object information of a target object; and displaying target video data, where the target video data is obtained by synthesizing a target image sequence of the target object and a background image in original video data, the target image sequence is obtained by matching the object information of the target object with a pre-stored image sequence of at least one detection object, and the background image is included in the original video data and does not include a detection object.

According to another aspect of the embodiments of this specification, a data processing method is further provided, including: obtaining original video data and object information of a target object; processing the original video data based on the object information of the target object, to obtain a target image sequence of the target object; processing the original video data, to obtain a background image, where the background image is included in the original video data and does not include a detection object; and synthesizing the target image sequence and the background image, to obtain target video data.

According to another aspect of the embodiments of this specification, a data processing method is further provided, including: obtaining object information of a target object; matching the object information of the target object with a pre-stored image sequence of at least one detection object, to obtain a target image sequence of the target object, where the image sequence of the at least one detection object is obtained by processing original video data; and synthesizing the target image sequence and a background image, to obtain target video data, where the background image is included in the original video data and does not include a detection object.

According to another aspect of the embodiments of this specification, a data processing method is further provided, including: obtaining original video data; receiving a target object inputted by a client; obtaining a target image sequence corresponding to the target object from the original video data; and displaying the target image sequence in a fade-in and fade-out manner.

According to another aspect of the embodiments of this specification, a storage medium is further provided. The storage medium includes a stored program, where the program, when run by a processor, controls a device at which the storage medium is located to perform any of the foregoing data processing methods.

According to another aspect of the embodiments of this specification, a computing device is further provided, including a memory and a processor, where the processor is configured to run a program stored in the memory, and the program, when run, performs any of the foregoing data processing methods.

According to another aspect of the embodiments of this specification, a data processing system is further provided, including: a processor; and a memory, connected to the processor, configured to provide the processor with instructions for processing the following processing steps: obtaining original video data and object information of a target object; processing the original video data based on the object information of the target object, to obtain a target image sequence of the target object; processing the original video data, to obtain a background image, where the background image is included in the original video data and does not include a detection object; and synthesizing the target image sequence and the background image, to obtain target video data.

According to another aspect of the embodiments of this specification, a data processing method is provided. The method includes: obtaining video data; receiving a target object; processing the video data to obtain one or more first images of the video data that contain an image of the target object and one or more second images of the video data that do not contain the image of the target object; discarding the one or more second images from the video data; generating a background image based on the one or more second images; synthesizing the one or more first images of the video data with the background image to generate one or more synthesized images; obtaining a target image sequence with the one or more synthesized images based on a time order of the one or more first images in the video data; and displaying each of the one or more synthesized images in the target image sequence in a fade-in and fade-out manner.

In some embodiments, the processing the video data to obtain one or more first images of the video data that contain an image of the target object comprises: obtaining a third image of the video data that includes the image of the target object; carving out the image of the target object from the third image to generate a segmentation mask; and using the segmentation mask to obtain the one or more first images of the video data that contain the image of the target object.

In some embodiments, the method further includes: periodically obtaining a segmentation mask by processing the video data to obtain a plurality of segmentation masks; and using a tracing algorithm to obtain identification information of the segmentation masks. Segmentation masks corresponding to same identification information are masks for the same object in the video.

In some embodiments, the processing the video data to obtain one or more first images of the video data that contain an image of the target object comprises: processing the video data based on a target attribute of the target object and a target time period, by: determining attribute information of an object in the one or more first images; matching the target attribute of the target object with the attribute information of the object in the one or more first images to determine an image sequence of the target object; and obtaining an image sequence in the target time period from the image sequence of the target object to obtain the target image sequence.

In some embodiments, each image of the video data is given a time stamp, and the synthesizing the one or more first images of the video data with the background image to generate one or more synthesized images comprises: synthesizing a plurality of first images onto the background image to generate one synthesized image.

In some embodiments, the synthesizing a plurality of first images onto the background image to generate one synthesized image comprises: including time stamps of the plurality of first images in the background image to generate the one synthesized image.

In some embodiments, the target object is a first target object, and the method further comprises: receiving a second target object different from the first target object; and processing the video data to obtain one or more fourth images of the video data that contain an image of the second target object. The one or more synthesized images are obtained by: synthesizing one of the one or more first images and one of the one or more fourth images onto the background image.

In some embodiments, the synthesizing one of the one or more first images and one of the one or more fourth images onto the background image comprises: synthesizing one of the one or more first images and one of the one or more fourth images onto the background image such that the image of the first target object does not overlap the image of the second target object.

According to another aspect of the embodiments of this specification, an apparatus is provided. The apparatus includes one or more processors and a memory storing instructions executable by the one or more processors to cause the one or more processors to perform operations comprising: obtaining video data; receiving a target object; processing the video data to obtain one or more first images of the video data that contain an image of the target object and one or more second images of the video data that do not contain the image of the target object; discarding the one or more second images from the video data; generating a background image based on the one or more second images; synthesizing the one or more first images of the video data with the background image to generate one or more synthesized images; obtaining a target image sequence with the one or more synthesized images based on a time order of the one or more first images in the video data; and displaying each of the one or more synthesized images in the target image sequence in a fade-in and fade-out manner.

According to another aspect of the embodiments of this specification, one or more non-transitory computer-readable storage media are provided. The one or more non-transitory computer-readable storage media are configured with instructions executable by one or more processors to cause the one or more processors to perform operations comprising: obtaining video data; receiving a target object; processing the video data to obtain one or more first images of the video data that contain an image of the target object and one or more second images of the video data that do not contain the image of the target object; discarding the one or more second images from the video data; generating a background image based on the one or more second images; synthesizing the one or more first images of the video data with the background image to generate one or more synthesized images; obtaining a target image sequence with the one or more synthesized images based on a time order of the one or more first images in the video data; and displaying each of the one or more synthesized images in the target image sequence in a fade-in and fade-out manner.

In some embodiments of this specification, after original video data and object information of a target object are obtained, a target image sequence of the target object may be obtained by processing the original video data based on the object information of the target object; a background image is obtained by processing the original video data; and target video data is obtained by synthesizing the target image sequence and the background image, thereby implementing video condensation. By extracting a target image sequence and synthesizing the target image sequence with a background image, redundant information in an original video is removed, and only a target of interest to a user is retained in the video, thereby reducing a length of a long-duration video, reducing storage costs, and improving efficiency of obtaining effective information by the user, further resolving a technical problem that a target object cannot be identified quickly due to a large amount of stored video data and a large amount of redundant information in the related art.

BRIEF DESCRIPTION OF THE DRAWINGS

The accompanying drawings described herein are used to provide a further understanding of this specification, and form a part of this specification. Exemplary embodiments of this specification and descriptions thereof are used to explain this specification, and do not constitute any inappropriate limitation to this specification. In the drawings.

DETAILED DESCRIPTION

Figure 1:
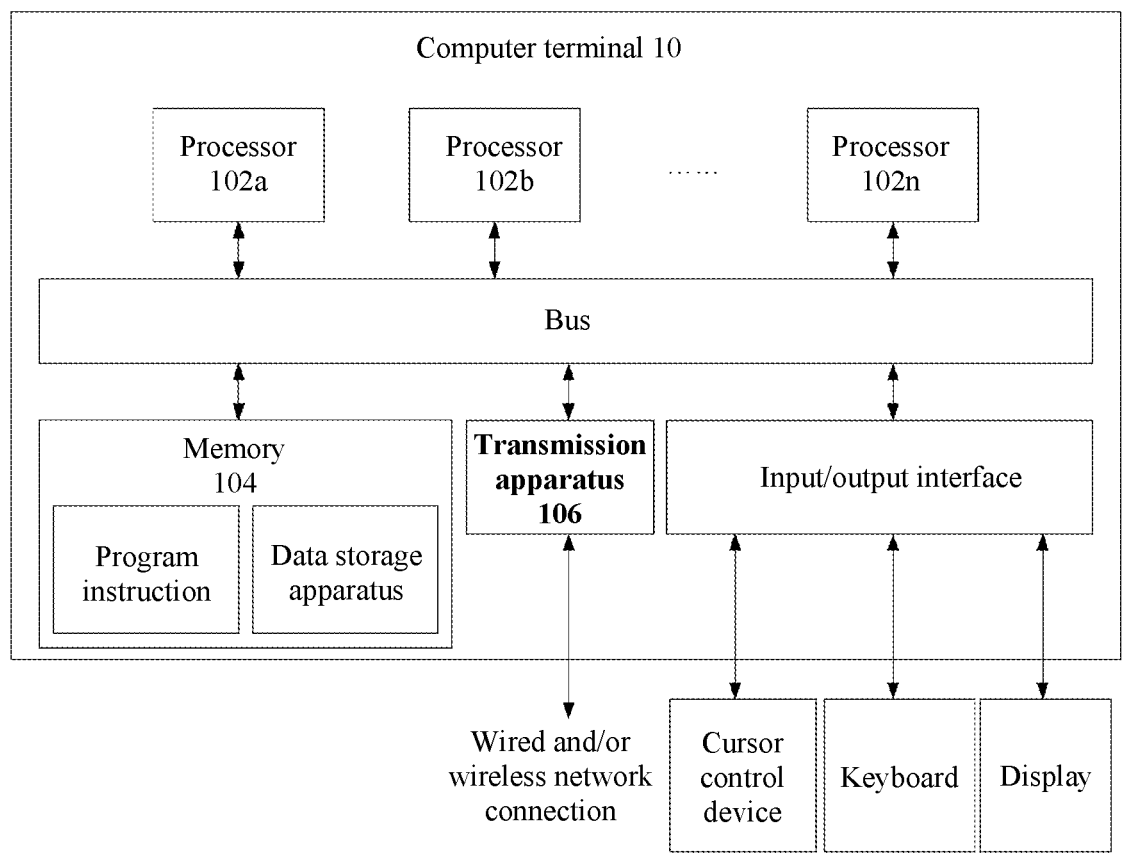
FIG. 1 is a structural block diagram of hardware of a computer terminal configured to implement a data processing method, according to an embodiment of this specification.

To make a person skilled in the art better understand solutions of this specification, the following clearly and completely describes the technical solutions in the embodiments of this specification with reference to the accompanying drawings in the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

The terms such as "first" and "second" in the specification, the claims, and the foregoing accompanying drawings of this specification are intended to distinguish between similar objects, but are not necessarily used for describing a particular sequence or a chronological order. It is to be understood that the data termed in such a way are interchangeable in proper circumstances, so that the embodiments of this specification described herein can be implemented in orders other than the order illustrated or described herein. Moreover, the terms "include," "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

First, some nouns or terms that appear during the description of the embodiments of this specification are applicable to the following explanations:

Video condensation: redundant information in video data may be removed, and targets that users are interested in are condensed, to generate a synthesized video with a high density both in time and space.

Mask: a processed image may be covered (wholly or partially) by using a selected image, graphic, or object, to control an image processing region or an image processing procedure. A mask is used for covering a particular image or object. The mask may be a binary image composed of 0 and 1.

Embodiment 1

Currently, surveillance cameras generate a huge amount of video data every day, and the video data usually needs to be stored for recording and viewing history information. However, all-day video data files are large, occupying large storage space, resulting in the increase of storage costs. There is a large amount of redundant information in the all-day video data, and it takes a long time to browse the all-day video data. The approach thus fails to identify effective information quickly.

In most scenarios, when browsing history video data, a user actually intends to browse a target of interest that appears in the video data, such as a person or a vehicle. In order to remove redundant information in long or short videos and retain key information, key frame screenshots may be saved for a single target, or blank frames in the long or short videos may be deleted. However, track information of the target may be lost in the process of saving the key frame screenshots, which results in a great information loss. To merely delete the blank frames results in a low video compression ratio.

To resolve the foregoing problems, according to an embodiment of this specification, a data processing method is provided. It should be noted that steps shown in the flowchart of the accompanying drawings may be performed, for example, in a computer system storing a group of computer executable instructions. In addition, although a logic sequence is shown in the flowchart, in some cases, the shown or described steps may be performed in a sequence different from that described herein.

The method embodiments provided in this specification may be executed in a mobile terminal, a computer terminal, a server, or a similar computing apparatus. FIG. 1 is a structural block diagram of hardware of a computer terminal (or a mobile device) configured to implement a data processing method. As shown in FIG. 1, a computer terminal 10 (or a mobile device 10) may include one or more (shown as 102a, 102b . . . , 102n in the figure) processors 102 (the processor 102 may include, but is not limited to, a processing apparatus, for example, a microprocessor (MCU) or a field programmable gate array (FPGA)), a memory 104 configured to store data, and a transmission apparatus 106 for a communication function. In addition, the computer terminal 10 (or the mobile device 10) may further include a display, an input/output interface (I/O interface), a universal serial bus (USB) port (may be included as one of ports of the bus), a network interface, a power supply and/or a camera. A person of ordinary skill in the art may understand that the structure shown in FIG. 1 is only for the purpose of illustration, and does not cause a limitation to the structure of the foregoing electronic apparatus. For example, the computer terminal 10 may also include more or fewer components than those shown in FIG. 1, or have a configuration different from that shown in FIG. 1.

It should be noted that the foregoing one or more processors 102 and/or other data processing circuits in the context may be generally referred to as a "data processing circuit." The data processing circuit may be entirely or partly embodied as software, hardware, firmware, or any combination thereof. In addition, the data processing circuit may be an independent processing module, or may be combined into any of other elements in the computer terminal 10 (or the mobile device) entirely or partly. As mentioned in the embodiments of this specification, the data processing circuit is used as a processor control (for example, a selection of a variable resistance terminal path connected to an interface).

The memory 104 may be configured to store a software program and a module of application software, for example, a program instruction/data storage apparatus corresponding to the data processing method in the embodiments of this specification. The processor 102 runs the software program and the module stored in the memory 104, to implement various functional applications and data processing, that is, implement the foregoing data processing method. The memory 104 may include a high-speed random memory, and a non-volatile memory such as one or more magnetic storage apparatuses, a flash memory, or another non-volatile solid-state memory. In some examples, the memory 104 may further include memories remotely disposed relative to the processor 102, and these remote memories may be connected to the computer terminal 10 through a network. An example of the foregoing network includes, but is not limited to, the Internet, an intranet, a local area network, a mobile communication network, and a combination thereof.

The transmission apparatus 106 is configured to receive or send data through a network. An example of the foregoing network may include a wireless network provided by a communication provider of the computer terminal 10. In an example, the transmission apparatus 106 includes a network interface controller (NIC), which may be connected to another network device through a base station so as to communicate with the Internet. In an embodiment, the transmission apparatus 106 may be a radio frequency (RF) module, which is configured to communicate with the Internet in a wireless manner.

The display may be a touch screen type liquid crystal display (LCD), and the LCD enables the user to interact with a user interface of the computer terminal 10 (or the mobile device).

It should be noted herein that, in some exemplary embodiments, the computer device (or the mobile device) shown in FIG. 1 may include a hardware element (including a circuit), a software element (including computer code stored on a computer-readable medium), or a combination of the hardware element and the software element. It should be pointed out that, FIG. 1 is only one of concrete instances, and aims to show types of components existing in the foregoing computer device (or the mobile device).

It should be noted herein that, in some embodiments, the computer device (or the mobile device) shown in FIG. 1 has a touch display (or referred to as a "touch screen" or a "touch display screen"). In some embodiments, the computer device (or the mobile device) shown in FIG. 1 has a graphical user interface (GUI), and a user may perform a man-machine interaction with the GUI by touching a touch sensitive surface with a finger touch and/or by using a gesture. The man-machine interaction function herein may include the following interactions such as webpage creating, drawing, word processing, electronic document making, games, video conference, instant messaging, email receiving and sending, call interface, digital video playing, digital music playing and/or network browsing. Executable instructions used for the foregoing man-machine interaction function are configured/stored in computer program products or readable storage media that can be executed by one or more processors.

Figure 2:
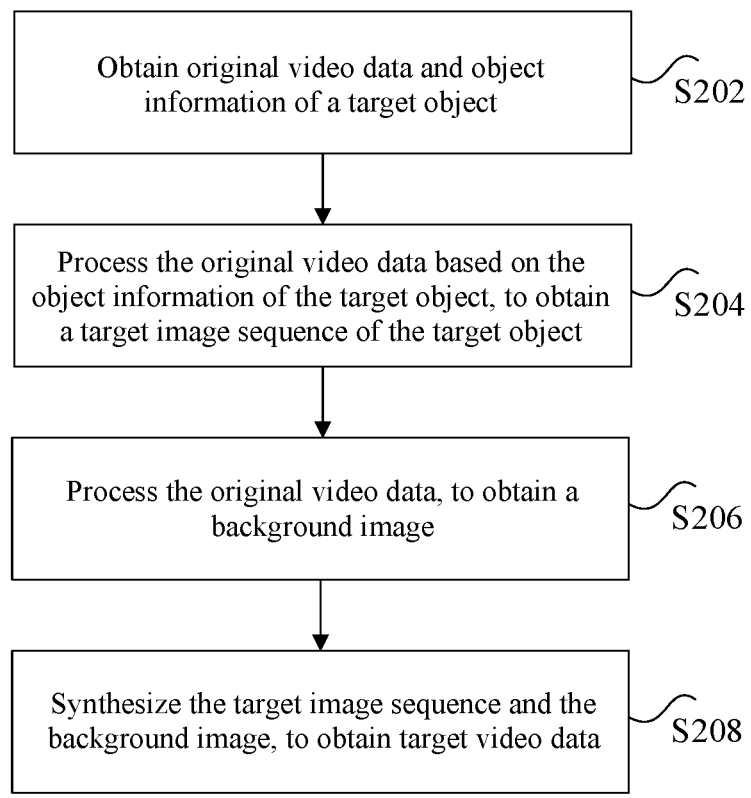
FIG. 2 is a flowchart of a first data processing method, according to an embodiment of this specification.

In the foregoing operating environment, this specification provides a data processing method shown in FIG. 2. FIG. 2 is a flowchart of a first data processing method, according to an embodiment of this specification. As shown in FIG. 2, the method includes steps S202-S208.

In step S202, the method includes obtaining original video data and object information of a target object.

The original video data in the foregoing step may be video data acquired by cameras installed in different application scenarios. The foregoing application scenarios include but are not limited to: a security surveillance scenario, a traffic surveillance scenario, an off-line shopping scenario, and the like. The video data is usually all-day 24-hour video data with a large amount of redundant information, which results in large occupied storage space and a long browsing time.

Figure 3:
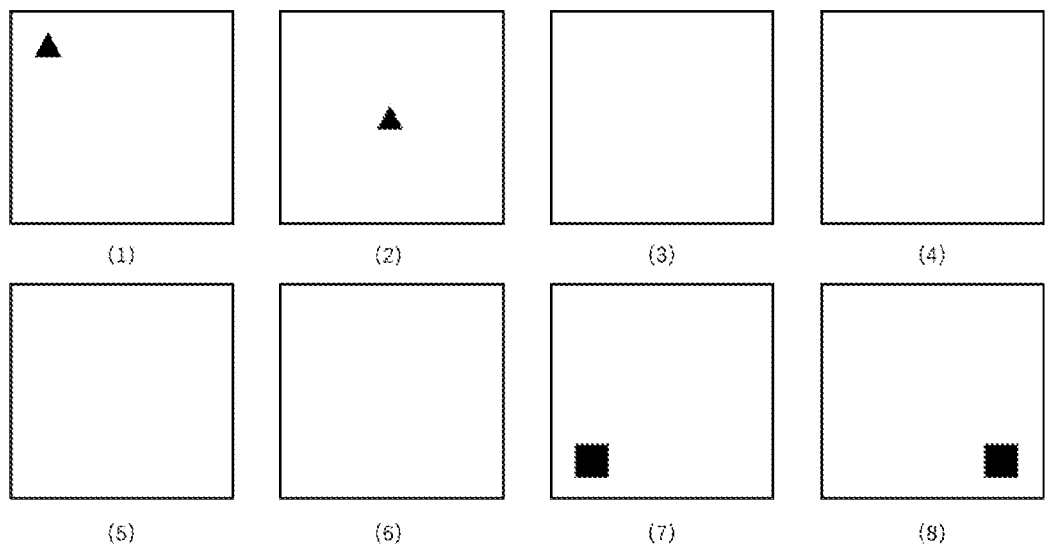
FIG. 3 is a schematic diagram of example original video data, according to an embodiment of this specification.

Using 8 frames of original video data shown in FIG. 3 as an example for illustration, the redundant information is mainly embodied in the following two aspects: there are more pure background frames with no targets, for example, the third, fourth, fifth, and sixth frames in FIG. 1 are all blank frames with no targets. Target density is low. For example, there is only one target in the first and the second frames in FIG. 1, and the target is represented by using a triangle. There is also only one target in the seventh and eighth frames, and the target is represented by using a square. These targets do not occur at the moment, and appear at different spatial locations.

The redundant information has low value, and if all the information is stored, storage resources are wasted and it is difficult for users to find effective information. To greatly compress the original video data and facilitate users to obtain effective information efficiently, the redundant information may be removed. If targets in the video are sparse, a one-day, 24-hour video may be reduced to several minutes after the redundant information is removed.

Figure 4:
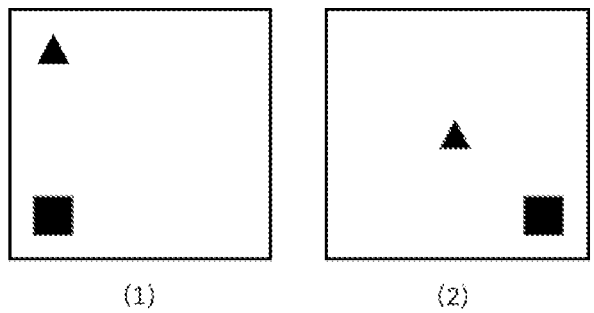
FIG. 4 is a schematic diagram of example target video data, according to an embodiment of this specification.

For example, as shown in FIG. 4, the blank frames may be deleted, and targets of two different spaces are synthesized into the same frame for display. The processed video only includes 2 frames, the storage cost is reduced greatly, and the users may obtain all information of interest by browsing only two frames of the video.

The target object in the foregoing step may be a target of interest to a user in the video data, for example, a person or a vehicle. That is, the target object may be a target that satisfies a particular condition and that is determined according to requirements of the user, for example, a male target, or a target of purchasing designated goods, but is not limited thereto. In some embodiments, the object information may include: a target attribute and a target time period. The target attribute may include an attribute of the target object, for example, gender, age, height, or garment, or may alternatively include a particular operation performed by the target object, for example, purchasing designated goods in an off-line shopping scenario, but is not limited thereto. The target time period may be an acquisition time of video data that the user needs to browse, for example, 24 hours, but is not limited thereto.

Figure 5:
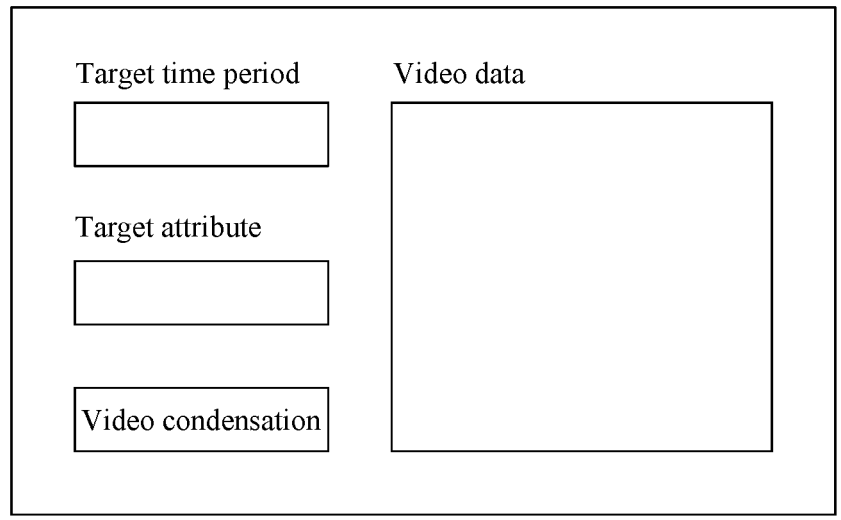
FIG. 5 is a schematic diagram of an example interaction interface, according to an embodiment of this specification.

In an exemplary embodiment, the object information of the target object needs to be determined according to requirements of the user. Therefore, an interaction interface may be provided for the users. As shown in FIG. 5, the user may operate in the interaction interface, select a target time period of video data that the user needs to browse, input a target attribute of a target that the user is interested in, and confirm the foregoing information by clicking a "video condensation" button after the foregoing operations. Therefore, a server may compress, based on the information inputted by the user, original video data acquired by a camera.

In step S204, the method includes processing the original video data based on the object information of the target object, to obtain a target image sequence of the target object.

The target image sequence in the foregoing step may be images of the target object acquired in different frames of images in the video data in the target time period. All the images of the target object may be sorted according to the acquisition time. To facilitate the user to accurately learn a time point at which the image is acquired, a timestamp may be labeled on each image.

In an exemplary embodiment, after obtaining a target time period and a target attribute selected by the user, the server may first perform target detection on each frame of image in the original video data based on the target attribute to recognize the target object, then extract an image sequence of the target object, and finally screens out an image sequence in the target time period, to obtain the target image sequence.

In another exemplary embodiment, to reduce a data processing amount and improve processing efficiency, the server may first obtain a corresponding part of video data from the original video data based on the target time period, then perform target detection on each frame of image in the part of video data based on the target attribute to recognize the target object, and finally extract images of the target object, to obtain the target image sequence.

In step S206, the method includes processing the original video data, to obtain a background image, where the background image is included in the original video data and does not include a detection object.

The background image in the foregoing step may be a background image in an original video image. The detection object may be a target such as a person or a vehicle, and the user may determine a target of interest in all the targets according to requirements, that is, the target object is an object satisfying the users' requirements in the detection objects.

In an exemplary embodiment, an image that is in the original video data and that only includes background information may be obtained as a background image by background modeling or selecting video frames without targets, or in other manners. However, this is not limited thereto. The background image may alternatively be obtained through other manners, which is not limited in this specification.

In step S208, the method includes synthesizing the target image sequence and the background image, to obtain target video data.

In an exemplary embodiment, images in the target image sequence may be superimposed into the background image in chronological order, to generate the target video data. For example, images at different moments in the target image sequence may be superimposed on the background image separately. In this case, a length of the target video data is the same as a length of the target image sequence. In another example, images at different moments in the target image sequence may be superimposed on different locations in the background image. In this case, the length of the target video data is shorter than the length of the target image sequence.

It should be noted that, the video synthesis process destroys a time relationship between the images and the original video data. Therefore, to facilitate the user to obtain an occurrence time of the target object, the acquisition time of the image may also be superimposed on the background image.

In another exemplary embodiment, after synthesis of the target video data, the target video data may be displayed in an interaction interface shown in FIG. 5, and an occurrence time point of the target object in the original video may be displayed above the target object, so as to facilitate the user to find required information from the target video data.

It should be further noted that, the foregoing method may further be applied to a tourism scenario, an exhibition hall visiting scenario, and the like. In the foregoing application scenarios, the user wants to generate video collections of travel or visit based on the captured original video data. Based on this, the original video data may be captured by the user through a mobile terminal, the target object may be the user, or may be all companions in the journey or the exhibition hall, but this specification is not limited thereto. In addition, the user may add different special effects into the target video data after the target video data is synthesized according to the preferences of the user, to obtain a final video collection to be watched by the relatives and friends.

According to the solution provided in the foregoing embodiments of this specification, after original video data and object information of a target object are obtained, a target image sequence of the target object may be obtained by processing the original video data based on the object information of the target object; a background image is obtained by processing the original video data; and target video data is obtained by synthesizing the target image sequence and the background image, thereby implementing video condensation. By extracting a target image sequence and synthesizing the target image sequence with a background image, redundant information in an original video is removed, and only a target of interest to a user is retained in the video, thereby reducing a length of a long-duration video, reducing storage costs, and improving efficiency of obtaining effective information by the user, further resolving a technical problem that a target object cannot be identified quickly due to a large amount of stored video data and a large amount of redundant information in the related art.

In the foregoing embodiments of this specification, the processing the original video data based on the object information of the target object, to obtain a target image sequence of the target object includes: processing the original video data, to obtain a segmentation mask of at least one detection object; processing the original video data by using the segmentation mask of the at least one detection object, to obtain an image sequence of the at least one detection object; and determining the target image sequence based on the object information of the target object.

Figure 6A:
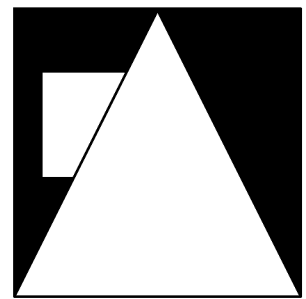
FIG. 6A is a schematic diagram of obtaining an image by using a target box, according to an embodiment of this specification.

The target image sequence is extracted by using a target box in the existing solution. However, such a manner introduces a large amount of interference information not belonging to the target object around the target object, which results in low visual effect and quality of the synthesized target video data. As shown in FIG. 6a, the target that the user is interested in is represented by using a triangle. In the image obtained by using the target box, another target represented by using a nearby rectangle and background information in the target box are retained in addition to the target represented by using the triangle.

Figure 6B:
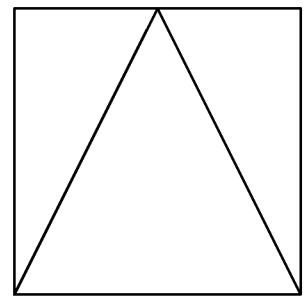
FIG. 6B is a schematic diagram of obtaining an image by using a mask, according to an embodiment of this specification.

In some embodiments, a mask of the target object may be predicted by using an instance segmentation technology, and the target box is replaced with the mask, so as to obtain more accurate information about the target object. As shown in FIG. 6b, the target that the user is interested in is represented by using a triangle, and only related information of the target represented by using the triangle is retained in the image obtained by using the mask.

In an exemplary embodiment, a segmentation mask of the detection object may be obtained by using deep learning segmentation. Then the detection object is extracted from the original video data according to the segmentation mask, to obtain an image sequence of the detection object, and a target image sequence of the target object is screened out finally.

The segmentation mask of the detection object is obtained by using the instance segmentation technology, so as to improve the accuracy of obtaining effective information and the quality of the synthesized video.

In the foregoing embodiments of this specification, the processing the original video data to obtain a segmentation mask of at least one detection object includes: processing the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

The foregoing identification information may be a unique ID number assigned to each detection object.

In an exemplary embodiment, the detection object in the video may be detected at regular intervals, to obtain a segmentation mask of a detection object in each frame of image. Segmentation masks in different image frames may be segmentation masks of the same detection object, or may be segmentation masks of different detection objects. Therefore, processing may be performed by using the tracing algorithm, and an ID number is assigned to each detection object. The same detection object has the same ID number, so that an ID number corresponding to each segmentation mask may be obtained. Further, all the obtained segmentation masks are classified according to the ID numbers, so as to obtain a series of segmentation masks of each detection object.

In the foregoing embodiments of this specification, the determining the target image sequence based on the object information of the target object includes: recognizing the image sequence of the at least one detection object, to determine attribute information of the at least one detection object; matching the target attribute of the target object with the attribute information of the at least one detection object, to determine an image sequence of the target object; and obtaining an image sequence in the target time period from the image sequence of the target object, to obtain the target image sequence.

In an exemplary embodiment, attributes such as age and gender of each detection object may be recognized from the image of the detection object by calling an attribute algorithm, or operations performed by each detection object may be recognized based on a movement track of the detection object, so as to obtain attribute information of each detection object. Further, the target attribute of the target object is matched with the attribute information of the detection object. The image sequence of the target object may be obtained when the matching is successful, and further, the target image sequence in the target time period may be extracted from the image sequence.

In another exemplary embodiment, based on the target time period, image sequences of all detection objects in the time period may be determined, and then the target attribute is matched with the attribute information of the detection objects. The target image sequence may be obtained in a case of successful matching.

In the foregoing embodiments of this specification, the synthesizing the target image sequence and the background image, to obtain target video data includes: determining a target location of the target image sequence in the target video data based on a preset video synthesis rule; and synthesizing the target image sequence and the background image based on the target location, to obtain the target video data.

The foregoing preset video synthesis rule may be a rule that ensures a high compression ratio of the target video data and ensures that the target object can be accurately recognized by the user. For example, the preset video synthesis rule may include that: the target video data has relatively short duration, and all target sequences may be displayed within a limited time; target objects that are not associated with each other in the original video data do not block each other in the target video data; and target objects that have peer or interactive relationships in the original video data are still retained in the target video data.

The foregoing target location may be a space and time location of the target image sequence in the target video data, and includes: a background image frame in the target video data and a location in the background image frame.

In an exemplary embodiment, when the target objects in the original video data are sparse, to further reduce the length of the target video data and enable each frame in the target video data to include more information, images of target objects at different moments may be synthesized at different locations of the background image based on the preset video synthesis rule. As shown in FIG. 4, images of different targets in the first frame and the seventh frame are synthesized at different locations of the same frame, and images of different targets in the second frame and the eighth frame are synthesized at different locations of the same frame.

In the foregoing embodiments of this specification, the determining a target location of the target image sequence in the target video data based on a preset video synthesis rule includes: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

The foregoing loss value may represent a loss cost of the space and time location of the target image sequence in the target video data. The loss cost is low if the preset video synthesis rule is satisfied, and the loss cost is high if the preset video synthesis rule is not satisfied. For example, if target objects that are not associated with each other in the original video data are blocked in the target video data, the loss cost increases; otherwise, the loss cost decreases. In another example, if association relationships of target image sequences that have peer or interactive relationships in the original video data are destroyed in the target video data, the loss cost increases; otherwise, the loss cost decreases.

The foregoing preset value may be a preset minimum loss cost, and may be determined according to actual video compression requirements, or may be set by the user according to the requirements. This is not limited in this specification.

In an exemplary embodiment, the length of the target video data may be estimated based on the length of the target image sequence, a location of the target image sequence in the target video data is randomly initialized, then the loss cost of the space and time location of the target image sequence in the target video data is calculated, and the space and time location of the target image sequence is further adjusted. Therefore, the loss cost is minimized through optimization and is used as a final target location for video synthesis.

An exemplary embodiment of this specification is described in detail below with reference to FIG. 7. The method may be performed by a server, and the procedure does not involve a step of inputting a target attribute and a target time period by the user and steps performed by a client, for example, displaying the target video data.

Figure 7:
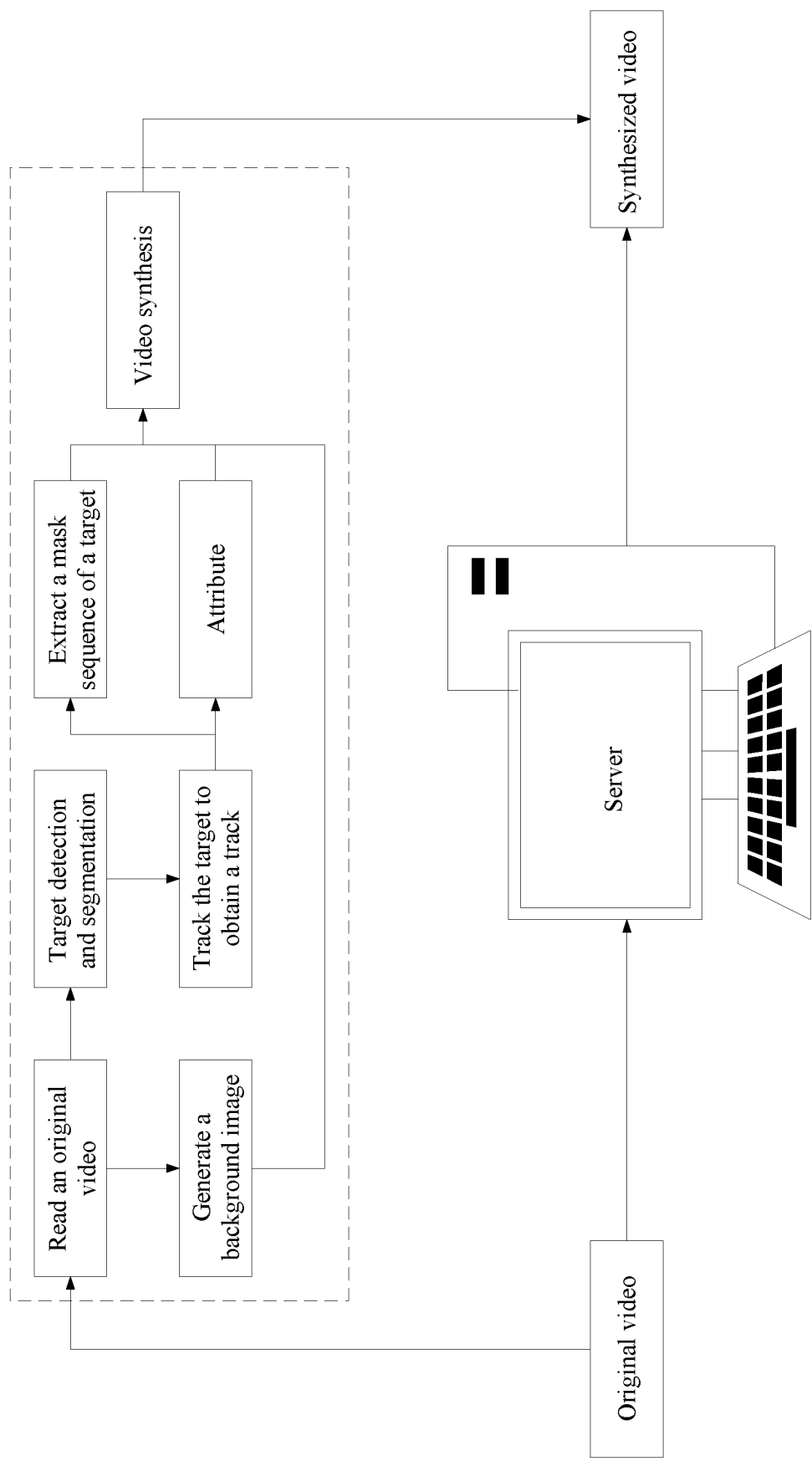
FIG. 7 is a flowchart of an example data processing method, according to an embodiment of this specification.

As shown in FIG. 7, the method includes the following steps: reading an original video; generating a background image only including background information; detecting targets of interest to a user in the original video and obtaining segmentation masks of the targets; determining movement tracks of the targets by calling a tracing algorithm, and assigning an ID number to each target; classifying the masks based on the ID numbers, and extracting mask sequences of the targets from the original video; recognizing an attribute of each target by calling an attribute algorithm, and labeling the mask sequences; and screening out a particular target sequence from the mask sequences according to a label selected by the user, and superimposing the target sequence on the background image in chronological order. When the targets in the original video are sparse, target sequences at different moments may occur at different locations at the same moment in the synthesized video, to enable each frame in the synthesized video to include more information.

By performing a structured processing on the obtained targets, the user may screen out required labels to generate a condensed video, thereby improving user experience.

It should be noted that, to make the description simple, the foregoing method embodiments are stated as a series of action combinations. However, a person skilled in the art needs to know that this specification is not limited to the described sequence of the actions because according to this specification, some steps may use another sequence or may be simultaneously performed. In addition, a person skilled in the art shall also be aware that all the embodiments described in the specification are exemplary embodiments, and the related actions and modules are not necessarily mandatory to this specification.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this specification essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal device (which may be a mobile phone, a computer, a server, a network device or the like) to perform the method described in the embodiments of this specification.

Embodiment 2

As can be learned from the description of the foregoing Embodiment 1 that, a server may process, after receiving object information of a target object inputted by a user, original video data based on the object information of the target object. A large amount of data needs to be processed and the whole processing takes a long time.

To resolve the foregoing problems, according to an embodiment of this specification, a data processing method further is provided.

Figure 8:
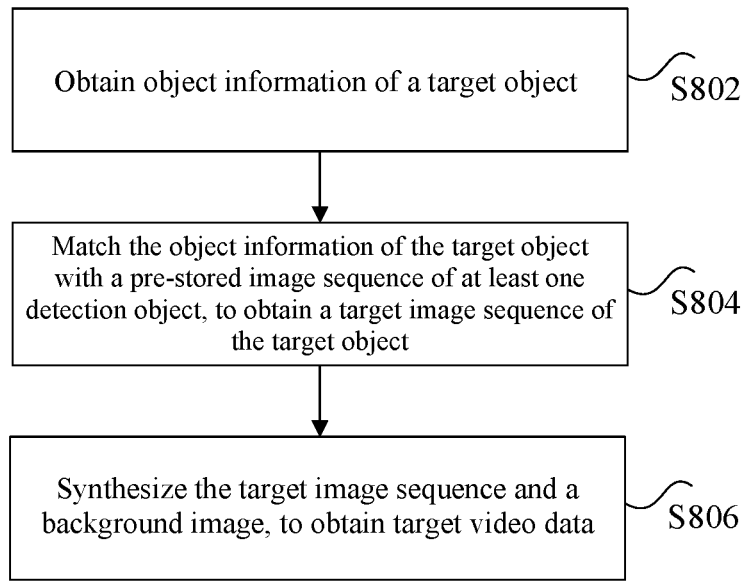
FIG. 8 is a flowchart of a second data processing method, according to an embodiment of this specification.

FIG. 8 is a flowchart of a second data processing method according to an embodiment of this specification. As shown in FIG. 8, the method includes steps S802-S806.

In step S802, the method includes obtaining object information of a target object.

The target object in the foregoing step may be a target of interest to a user in the video data, for example, a person or a vehicle. That is, the target object may be a target that satisfies a particular condition and that is determined according to requirements of the user, for example, a male target, or a target of purchasing designated goods, but is not limited thereto. In some embodiments, the object information may include: a target attribute and a target time period. The target attribute may include an attribute of the target object, for example, gender, age, height, or garment, or may alternatively include a particular operation performed by the target object, for example, purchasing designated goods in an off-line shopping scenario, but is not limited thereto. The target time period may be an acquisition time of video data that the user needs to browse, for example, 24 hours, but is not limited thereto.

In step S804, the method includes matching the object information of the target object with a pre-stored image sequence of at least one detection object, to obtain a target image sequence of the target object, where the image sequence of the at least one detection object is obtained by processing original video data.

The original video data in the foregoing step may be video data acquired by cameras installed in different application scenarios. The foregoing application scenarios include but are not limited to: a security surveillance scenario, a traffic surveillance scenario, an off-line shopping scenario, and the like. The video data is usually all-day 24-hour video data with a large amount of redundant information, which results in large occupied storage space and a long browsing time.

The detection object may be a target such as a person or a vehicle, and the user may determine a target of interest in all the targets according to requirements, that is, the target object is an object satisfying the users' requirements in the detection objects. The image sequence may be images of detection objects acquired in different frames of images in the original video data. All the images are sorted according to the acquisition time. To facilitate the user to accurately learn a time point at which the detection object is acquired, a timestamp may be labeled on each image.

In an exemplary embodiment, after the user selects the target attribute and the target time period, to reduce the processing time of the server, the server may directly perform, after obtaining the original video data acquired by a camera, target detection on the original video data, to recognize each detection object, extract image sequences of the detection objects, and finally store the extracted image sequences in a database. Based on this, after receiving the target attribute and the target time period, the server only needs to match the target attribute and the target time period with the stored image sequences of the detection objects, determine the image sequence of the target object when the matching is successful, and screen out the target image sequence in the target time period based on the timestamp of the image.

In step S806, the method includes synthesizing the target image sequence and a background image, to obtain target video data, where the background image is included in the original video data and does not include a detection object.

The background image in the foregoing step may be a background image in an original video image.

In an exemplary embodiment, same as the foregoing steps, to reduce the processing time of the server, after the original video data is obtained, an image that is in the original video data and that only includes background information may be directly obtained as a background image by background modeling or selecting video frames without targets, or in other manners, and the background image is stored. Therefore, after the target image sequence is obtained, the target video data may be generated directly. By storing the background image, the background image can be reused to save computing resources of the server.

According to the solution provided in the foregoing embodiments of this specification, after object information of a target object is obtained, a target image sequence of the target object may be obtained by matching the object information of the target object with a pre-stored image sequence of at least one detection object; further, target video data is obtained by synthesizing the target image sequence and the background image, thereby implementing video condensation. It is easy to notice that, by extracting a target image sequence and synthesizing the target image sequence with a background image, redundant information in an original video is removed, and only targets that users are interested in are retained in the video, thereby reducing a length of a long-duration video, reducing storage costs, and improving efficiency of obtaining effective information by the user, further resolving a technical problem that a target object cannot be identified quickly due to a large amount of stored video data and a large amount of redundant information in the related art.

In the foregoing embodiments of this specification, the method further includes: processing the original video data, to obtain a segmentation mask of at least one detection object; processing the original video data by using the segmentation mask of the at least one detection object, to obtain an image sequence of the at least one detection object; recognizing the image sequence of the at least one detection object, to determine attribute information of the at least one detection object; and storing the image sequence and the attribute information of the at least one detection object.

In some embodiments, a mask of the target object may be predicted by using an instance segmentation technology, and the target box is replaced with the mask, so as to obtain more accurate information about the target object. In an exemplary embodiment, a segmentation mask of the detection object may be obtained by using deep learning segmentation. Then the detection object is extracted from the original video data according to the segmentation mask, to obtain an image sequence of the detection object, and a target image sequence of the target object is screened out finally.

It should be noted that, to reduce the processing time of the server, while obtaining the image sequence of each detection object, the server may recognize the detection object, to obtain attribute information of the detection object and label the image sequence, so as to facilitate matching with the target attribute subsequently and obtaining the target image sequence of the target object quickly.

In the foregoing embodiments of this specification, the processing the original video data to obtain a segmentation mask of at least one detection object includes: processing the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In the foregoing embodiments of this specification, the matching the object information of the target object with a pre-stored image sequence of at least one detection object, to obtain a target image sequence of the target object includes: matching the target attribute of the target object with the attribute information of the at least one detection object, to determine an image sequence of the target object; and obtaining an image sequence in the target time period from the image sequence of the target object, to obtain the target image sequence.

In an exemplary embodiment, the image sequences stored in the database are labeled in advance, and the attribute information of each detection object is annotated. By matching the target attribute selected by the user with the attribute information of each detection object, the target object may be determined, and the image sequence of the target object is read. Further, the target image sequence is determined based on the timestamp.

In the foregoing embodiments of this specification, the synthesizing the target image sequence and the background image, to obtain target video data includes: determining a target location of the target image sequence in the target video data based on a preset video synthesis rule; and synthesizing the target image sequence and the background image based on the target location, to obtain the target video data.

In the foregoing embodiments of this specification, the determining a target location of the target image sequence in the target video data based on a preset video synthesis rule includes: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 3

According to an embodiment of this specification, a data processing method is further provided.

Figure 9:
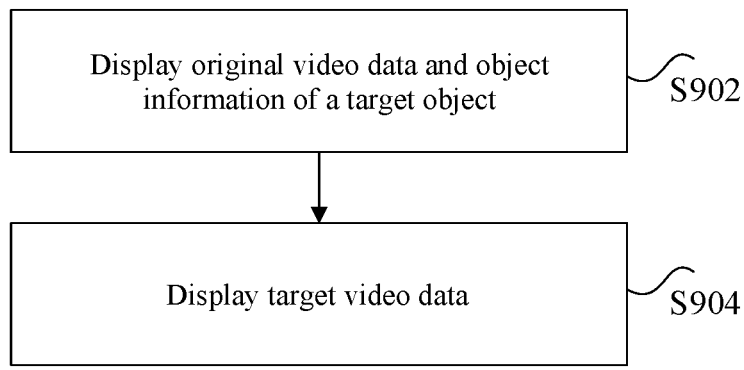
FIG. 9 is a flowchart of a third data processing method, according to an embodiment of this specification.

FIG. 9 is a flowchart of a third data processing method according to an embodiment of this specification. As shown in FIG. 9, the method includes steps S902 and S904.

In step S902, the method includes displaying original video data and object information of a target object.

In an exemplary embodiment, the original video data and the object information of the target object may be displayed in an interaction interface shown in FIG. 5, where the original video data is displayed in a display region at the right side.

In step S904, the method includes displaying target video data, where the target video data is obtained by synthesizing a target image sequence of the target object and a background image in the original video data, the target image sequence is obtained by processing the original video data based on the object information of the target object, and the background image is included in the original video data and does not include a detection object.

In an exemplary embodiment, the target video data may also be displayed in the interaction interface shown in FIG. 5. After the target video data is synthesized, the target video data may replace the original video data and be displayed in the display region at the right side.

In the foregoing embodiments of this specification, the processing the original video data based on the object information of the target object includes: processing the original video data, to obtain a segmentation mask of at least one detection object; processing the original video data by using the segmentation mask of the at least one detection object, to obtain an image sequence of the at least one detection object; and determining the target image sequence based on the object information of the target object.

In the foregoing embodiments of this specification, the processing the original video data to obtain a segmentation mask of at least one detection object includes: processing the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In the foregoing embodiments of this specification, the determining the target image sequence based on the object information of the target object includes: recognizing the image sequence of the at least one detection object, to determine attribute information of the at least one detection object; matching the target attribute of the target object with the attribute information of the at least one detection object, to determine an image sequence of the target object; and obtaining an image sequence in the target time period from the image sequence of the target object, to obtain the target image sequence.

In the foregoing embodiments of this specification, the synthesizing a target image sequence of the target object and a background image in the original video data includes: determining a target location of the target image sequence in the target video data based on a preset video synthesis rule; synthesizing the target image sequence and the background image based on the target location, to obtain the target video data.

In the foregoing embodiments of this specification, the determining a target location of the target image sequence in the target video data based on a preset video synthesis rule includes: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

In the foregoing embodiments of this specification, the target image sequence and/or an acquisition time of the target image sequence is displayed in the target video data in a preset manner.

To facilitate the user to find required information from the target video data quickly, a preset manner may be set in advance. The manner may be used as a display manner of the target image sequence and/or the acquisition time, to remind the user. In some embodiments, the display manner may be adjusted by the user according to preferences.

The preset manner being flicker is used as an example for description. In the first exemplary embodiment, a flickering target box may be displayed in the target video data, where the target object is located in the target box. In the second exemplary embodiment, an image of the target object may be directly controlled to flicker. In the third exemplary embodiment, the acquisition time may be directly controlled to flicker. In the fourth exemplary embodiment, the image of the target object and the acquisition time may be controlled to flicker at the same time. The foregoing preset manners may be other manners, which is not limited in this specification.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 4

According to an embodiment of this specification, a data processing method is further provided.

Figure 10:
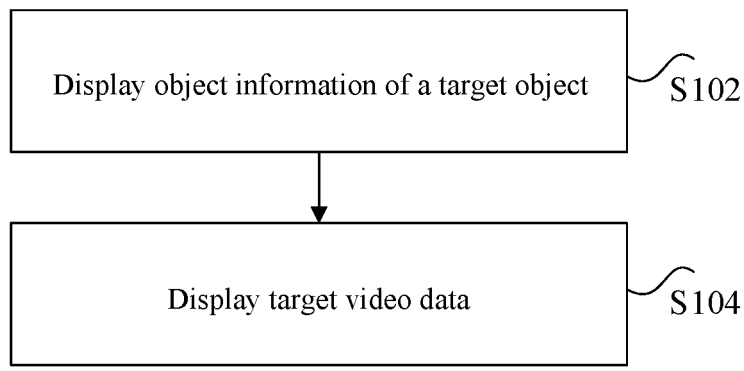
FIG. 10 is a flowchart of a fourth data processing method, according to an embodiment of this specification.

FIG. 10 is a flowchart of a fourth data processing method according to an embodiment of this specification. As shown in FIG. 10, the method includes steps S102 and S104

In step S102, the method includes displaying object information of a target object.

In an exemplary embodiment, the object information of the target object may be displayed in an interaction interface shown in FIG. 5.

In step S202, the method includes displaying target video data, where the target video data is obtained by synthesizing a target image sequence of the target object and a background image in original video data, the target image sequence is obtained by matching the object information of the target object with a pre-stored image sequence of at least one detection object, and the background image is included in the original video data and does not include a detection object.

In an exemplary embodiment, the target video data may also be displayed in the interaction interface shown in FIG. 5, where the target video data is displayed in the display region at the right side.

In the foregoing embodiments of this specification, the method further includes: processing the original video data, to obtain a segmentation mask of at least one detection object; processing the original video data by using the segmentation mask of the at least one detection object, to obtain an image sequence of the at least one detection object; recognizing the image sequence of the at least one detection object, to determine attribute information of the at least one detection object; and storing the image sequence and the attribute information of the at least one detection object.

In the foregoing embodiments of this specification, the processing the original video data to obtain a segmentation mask of at least one detection object includes: processing the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In the foregoing embodiments of this specification, the matching the object information of the target object with a pre-stored image sequence of at least one detection object includes: matching the target attribute of the target object with the attribute information of the at least one detection object, to determine an image sequence of the target object; obtaining an image sequence in the target time period from the image sequence of the target object, to obtain the target image sequence.

In the foregoing embodiments of this specification, the synthesizing a target image sequence of the target object and a background image in the original video data includes: determining a target location of the target image sequence in the target video data based on a preset video synthesis rule; synthesizing the target image sequence and the background image based on the target location, to obtain the target video data.

In the foregoing embodiments of this specification, the determining a target location of the target image sequence in the target video data based on a preset video synthesis rule includes: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

In the foregoing embodiments of this specification, the target image sequence and/or an acquisition time of the target image sequence is displayed in the target video data in a preset manner.

It should be noted that, the exemplary implementation solution in the foregoing embodiments of this specification has the same as the solution, the application scenario, and the implementation process provided in Embodiment 3, but is not limited to the solution provided in Embodiment 3.

Embodiment 5

Figure 11:
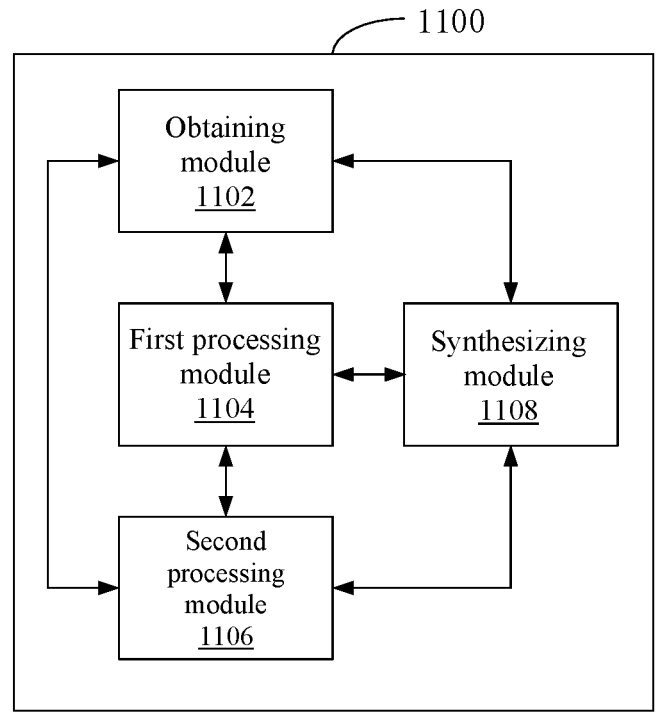
FIG. 11 is a schematic diagram of a first data processing apparatus, according to an embodiment of this specification.

According to an embodiment of this specification, a data processing apparatus for performing the foregoing data processing method is further provided. As shown in FIG. 11, the apparatus 1100 includes: an obtaining module 1102, a first processing module 1104, a second processing module 1106, and a synthesizing module 1108.

The obtaining module 1102 is configured to obtain original video data and object information of a target object. The first processing module 1104 is configured to process the original video data based on the object information of the target object, to obtain a target image sequence of the target object. The second processing module 1106 is configured to process the original video data, to obtain a background image, where the background image is included in the original video data and does not include a detection object. The synthesizing module 1108 is configured to synthesize the target image sequence and the background image, to obtain target video data.

It should be noted herein that the obtaining module 1102, the first processing module 1104, the second processing module 1106, and the synthesizing module 1108 correspond to step S202 to step S208 in Embodiment 1. An implementation instance and an application scenario of the four modules are the same as those of the corresponding steps, but are not limited to the content disclosed in Embodiment 1. It should be noted that, the foregoing modules may be run on a computer terminal 10 provided in Embodiment 1 as a part of the apparatus.

In the foregoing embodiments of this specification, the first processing module includes: a first processing unit, a second processing unit, and a first determining unit.

The first processing unit is configured to process the original video data, to obtain a segmentation mask of at least one detection object. The second processing unit is configured to process the original video data by using the segmentation mask of the at least one detection object, to obtain an image sequence of the at least one detection object. The first determining unit is configured to determine the target image sequence based on the object information of the target object.

In the foregoing embodiments of this specification, the first processing unit includes: a detection subunit, a first processing subunit, and a second processing subunit.

The detection subunit is configured to detect the original video data, to obtain at least one segmentation mask. The first processing subunit is configured to process the at least one segmentation mask by using a tracing algorithm, to obtain identification information of the at least one segmentation mask, where segmentation masks corresponding to the same identification information are masks of the same detection object. The second processing subunit is configured to obtain the segmentation mask of the at least one detection object based on the identification information of the at least one segmentation mask.

In the foregoing embodiments of this specification, the first determining unit includes: a recognition subunit, a matching subunit, and an obtaining subunit.

The recognition subunit is configured to recognize the image sequence of the at least one detection object, to determine attribute information of the at least one detection object. The matching subunit is configured to match the target attribute of the target object with the attribute information of the at least one detection object, to determine an image sequence of the target object. The obtaining subunit is configured to obtain an image sequence in the target time period from the image sequence of the target object, to obtain the target image sequence.

In the foregoing embodiments of this specification, the synthesizing module includes a second determining unit and a synthesizing unit.

The second determining unit is configured to determine a target location of the target image sequence in the target video data based on a preset video synthesis rule. The synthesizing unit is configured to synthesize the target image sequence and the background image based on the target location, to obtain the target video data.

In the foregoing embodiments of this specification, the second determining unit includes: a first determining subunit, a third processing subunit, a second determining subunit, and a third determining subunit.

The first determining subunit is configured to determine a length of the target video data based on a length of the target image sequence, and determine a first location of the target image sequence in the target video data. The third processing subunit is configured to obtain a loss value of the first location based on the preset video synthesis rule. The second determining subunit is configured to determine, when the loss value of the first location is greater than a preset value, a second location of the target image sequence in the target video data, and use the second location as the first location until the loss value of the first location is less than the preset value. The third determining subunit is configured to determine the first location as the target location when the loss value of the first location is less than the preset value.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 6

Figure 12:
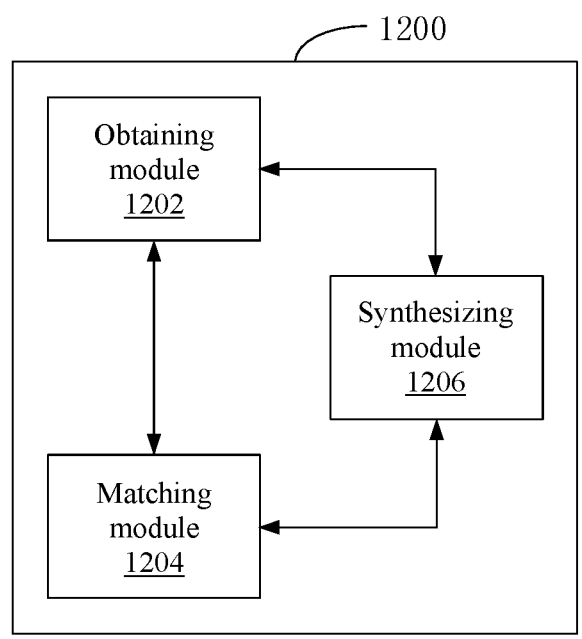
FIG. 12 is a schematic diagram of a second data processing apparatus, according to an embodiment of this specification.

According to an embodiment of this specification, a data processing apparatus for performing the foregoing data processing method is further provided. As shown in FIG. 12, the apparatus 1200 includes: an obtaining module 1202, a matching module 1204, and a synthesizing module 1206.

The obtaining module 1202 is configured to obtain object information of a target object. The matching module 1204 is configured to match the object information of the target object with a pre-stored image sequence of at least one detection object, to obtain a target image sequence of the target object, where the image sequence of the at least one detection object is obtained by processing original video data. The synthesizing module 1206 is configured to synthesize the target image sequence and a background image, to obtain target video data, where the background image is included the original video data and does not include a detection object.

It should be noted herein that the obtaining module 1202, the matching module 1204, and the synthesizing module 1206 correspond to step S802 to step S806 in Embodiment 2. An implementation instance and an application scenario of the three modules are the same as those of the corresponding steps, but are not limited to the content disclosed in Embodiment 2. It should be noted that, the foregoing modules may be run on a computer terminal 10 provided in Embodiment 1 as a part of the apparatus.

In the foregoing embodiments of this specification, the apparatus further includes: a first processing module, a second processing module, a determining module, and a storage module.

The first processing module is configured to process the original video data, to obtain a segmentation mask of at least one detection object. The second processing module is configured to process the original video data by using the segmentation mask of the at least one detection object, to obtain an image sequence of the at least one detection object. The determining module is configured to recognize the image sequence of the at least one detection object, to determine attribute information of the at least one detection object. The storage module is configured to store the image sequence and the attribute information of the at least one detection object.

In the foregoing embodiments of this specification, the first processing module includes: a detection unit, a first processing unit, and a second processing unit.

The detection unit is configured to detect the original video data, to obtain at least one segmentation mask. The first processing unit is configured to process the at least one segmentation mask by using a tracing algorithm, to obtain identification information of the at least one segmentation mask, where segmentation masks corresponding to the same identification information are masks of the same detection object. The second processing unit is configured to obtain the segmentation mask of the at least one detection object based on the identification information of the at least one segmentation mask.

In the foregoing embodiments of this specification, the matching module includes a matching unit and an obtaining unit.

The matching unit is configured to match the target attribute of the target object with the attribute information of the at least one detection object, to determine an image sequence of the target object. The obtaining unit is configured to obtain an image sequence in the target time period from the image sequence of the target object, to obtain the target image sequence.

In the foregoing embodiments of this specification, the synthesizing module includes a determining unit and a synthesizing unit.

The determining unit is configured to determine a target location of the target image sequence in the target video data based on a preset video synthesis rule. The synthesizing unit is configured to synthesize the target image sequence and the background image based on the target location, to obtain the target video data.

In the foregoing embodiments of this specification, the determining unit includes: a first determining subunit, a processing subunit, a second determining subunit, and a third determining subunit.

The first determining subunit is configured to determine a length of the target video data based on a length of the target image sequence, and determine a first location of the target image sequence in the target video data. The processing subunit is configured to obtain a loss value of the first location based on the preset video synthesis rule. The second determining subunit is configured to determine, when the loss value of the first location is greater than a preset value, a second location of the target image sequence in the target video data, and use the second location as the first location until the loss value of the first location is less than the preset value. The third determining subunit is configured to determine the first location as the target location when the loss value of the first location is less than the preset value.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 7

Figure 13:
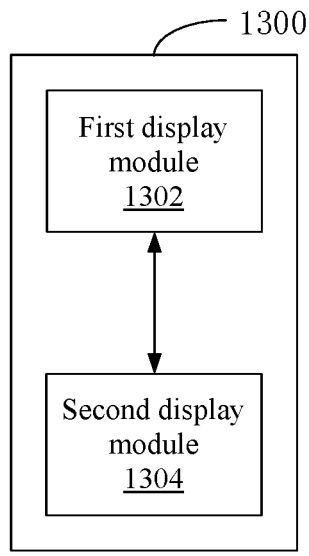
FIG. 13 is a schematic diagram of a third data processing apparatus, according to an embodiment of this specification.

According to an embodiment of this specification, a data processing apparatus for performing the foregoing data processing method is further provided. As shown in FIG. 13, the apparatus 1300 includes: a first display module 1302 and a second display module 1304.

The first display module 1302 is configured to display original video data and object information of a target object. The second display module 1304 is configured to display target video data, where the target video data is obtained by synthesizing a target image sequence of the target object and a background image in the original video data, the target image sequence is obtained by processing the original video data based on the object information of the target object, and the background image is included in the original video data and does not include a detection object.

It should be noted herein that the first display module 1302 and the second display module 1304 correspond to step S902 to step S904 in Embodiment 3. An implementation instance and an application scenario of the two modules are the same as those of the corresponding steps, but are not limited to the content disclosed in Embodiment 3. It should be noted that, the foregoing modules may be run on a computer terminal 10 provided in Embodiment 1 as a part of the apparatus.

In the foregoing embodiments of this specification, the apparatus further includes: a first processing module, a second processing module, and a first determining module.

The first processing module is configured to process the original video data, to obtain a segmentation mask of at least one detection object. The second processing module is configured to process the original video data by using the segmentation mask of the at least one detection object, to obtain an image sequence of the at least one detection object. The first determining module is configured to determine the target image sequence based on the object information of the target object.

In the foregoing embodiments of this specification, the first processing module includes: a detection unit, a first processing unit, and a second processing unit.

The detection unit is configured to detect the original video data, to obtain at least one segmentation mask. The first processing unit is configured to process the at least one segmentation mask by using a tracing algorithm, to obtain identification information of the at least one segmentation mask, where segmentation masks corresponding to the same identification information are masks of the same detection object. The second processing unit is configured to obtain the segmentation mask of the at least one detection object based on the identification information of the at least one segmentation mask.

In the foregoing embodiments of this specification, the first determining module includes: a recognition unit, a matching unit, and an obtaining unit.

The recognition unit is configured to recognize the image sequence of the at least one detection object, to determine attribute information of the at least one detection object. The matching unit is configured to match the target attribute of the target object with the attribute information of the at least one detection object, to determine an image sequence of the target object. The obtaining unit is configured to obtain an image sequence in the target time period from the image sequence of the target object, to obtain the target image sequence.

In the foregoing embodiments of this specification, the apparatus further includes: a second determining module and a synthesizing module.

The second determining module is configured to determine a target location of the target image sequence in the target video data based on a preset video synthesis rule. The synthesizing module is configured to synthesize the target image sequence and the background image based on the target location, to obtain the target video data.

In the foregoing embodiments of this specification, the second determining module includes: a first determining unit, a third processing unit, a second determining unit, and a third determining unit.

The first determining unit is configured to determine a length of the target video data based on a length of the target image sequence, and determine a first location of the target image sequence in the target video data. The third processing unit is configured to obtain a loss value of the first location based on the preset video synthesis rule. The second determining unit is configured to determine, when the loss value of the first location is greater than a preset value, a second location of the target image sequence in the target video data, and use the second location as the first location until the loss value of the first location is less than the preset value. The third determining unit is configured to determine the first location as the target location when the loss value of the first location is less than the preset value.

In the foregoing embodiments of this specification, the second display module is further configured to display the target image sequence and/or an acquisition time of the target image sequence in the target video data in a preset manner.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 8

According to an embodiment of this specification, a data processing apparatus for performing the foregoing data processing method is further provided. As shown in FIG. 13, the apparatus includes: a first display module 1302 and a second display module 1304.

The first display module 1302 is configured to display object information of a target object. The second display module 1304 is configured to display target video data, where the target video data is obtained by synthesizing a target image sequence of the target object and a background image in original video data, the target image sequence is obtained by matching the object information of the target object with a pre-stored image sequence of at least one detection object, and the background image is included in the original video data and does not include a detection object.

It should be noted herein that the first display module 1302 and the second display module 1304 correspond to step S102 to step S104 in Embodiment 4. An implementation instance and an application scenario of the two modules are the same as those of the corresponding steps, but are not limited to the content disclosed in Embodiment 4. It should be noted that, the foregoing modules may be run on a computer terminal 10 provided in Embodiment 1 as a part of the apparatus.

In the foregoing embodiments of this specification, the apparatus further includes: a first processing module, a second processing module, a first determining module, and a storage module.

The first processing module is configured to process the original video data, to obtain a segmentation mask of at least one detection object. The second processing module is configured to process the original video data by using the segmentation mask of the at least one detection object, to obtain an image sequence of the at least one detection object. The first determining module is configured to recognize the image sequence of the at least one detection object, to determine attribute information of the at least one detection object. The storage module is further configured to store the image sequence and the attribute information of the at least one detection object.

In the foregoing embodiments of this specification, the first processing module includes: a detection unit, a first processing unit, and a second processing unit.

The detection unit is configured to detect the original video data, to obtain at least one segmentation mask. The first processing unit is configured to process the at least one segmentation mask by using a tracing algorithm, to obtain identification information of the at least one segmentation mask, where segmentation masks corresponding to the same identification information are masks of the same detection object. The second processing unit is configured to obtain the segmentation mask of the at least one detection object based on the identification information of the at least one segmentation mask.

In the foregoing embodiments of this specification, the apparatus further includes: a matching module and an obtaining module.

The matching module is configured to match the target attribute of the target object with the attribute information of the at least one detection object, to determine an image sequence of the target object. The obtaining module is configured to obtain an image sequence in the target time period from the image sequence of the target object, to obtain the target image sequence.

In the foregoing embodiments of this specification, the apparatus further includes: a second determining module and a synthesizing module.

The second determining module is configured to determine a target location of the target image sequence in the target video data based on a preset video synthesis rule. The synthesizing module is configured to synthesize the target image sequence and the background image based on the target location, to obtain the target video data.

In the foregoing embodiments of this specification, the second determining module includes: a first determining unit, a third processing unit, a second determining unit, and a third determining unit.

The first determining unit is configured to determine a length of the target video data based on a length of the target image sequence, and determine a first location of the target image sequence in the target video data. The third processing unit is configured to obtain a loss value of the first location based on the preset video synthesis rule. The second determining unit is configured to determine, when the loss value of the first location is greater than a preset value, a second location of the target image sequence in the target video data, and use the second location as the first location until the loss value of the first location is less than the preset value. The third determining unit is configured to determine the first location as the target location when the loss value of the first location is less than the preset value.

In the foregoing embodiments of this specification, the second display module is further configured to display the target image sequence and/or an acquisition time of the target image sequence in the target video data in a preset manner.

It should be noted that, the exemplary implementation solution in the foregoing embodiments of this specification has the same as the solution, the application scenario, and the implementation process provided in Embodiment 1, but is not limited to the solution provided in Embodiment 1.

Embodiment 9

According to an embodiment of this specification, a data processing method is further provided.

Figure 14:
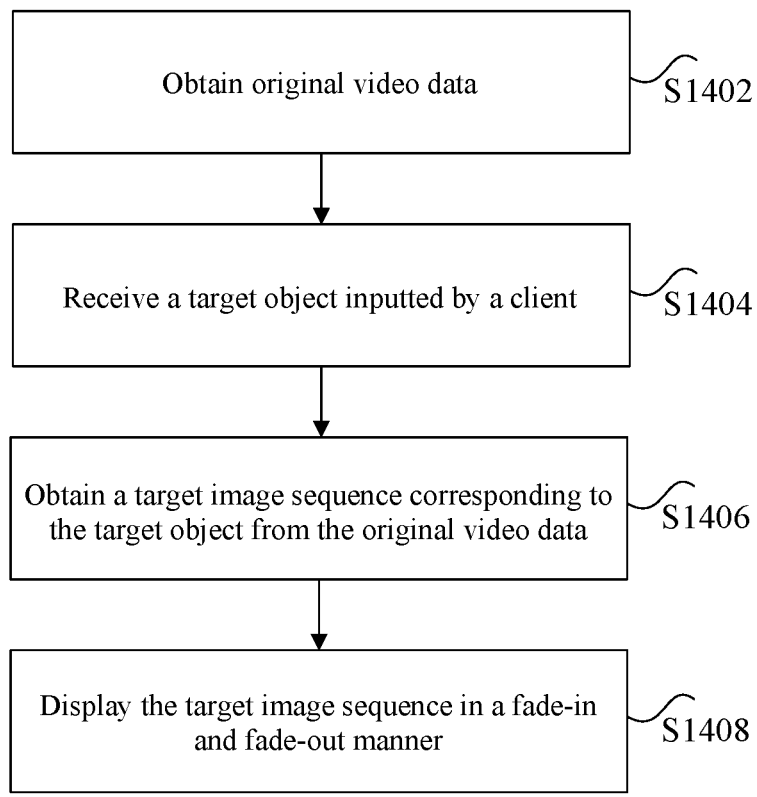
FIG. 14 is a flowchart of a fourth data processing method, according to an embodiment of this specification.

FIG. 14 is a flowchart of a fifth data processing method according to an embodiment of this specification. As shown in FIG. 14, the method includes steps S1402-S1408.

In Step S1402, the method includes obtaining original video data.

The original video data in the foregoing step may be video data acquired by cameras installed in different application scenarios. The foregoing application scenarios include but are not limited to: a security surveillance scenario, a traffic surveillance scenario, an off-line shopping scenario, and the like. The video data is usually all-day 24-hour video data with a large amount of redundant information, which results in large occupied storage space and a long browsing time.

In Step S1402, the method includes receiving a target object inputted by a client.

The client in the foregoing step may be a mobile terminal, such as a smartphone (including an Android mobile phone or an iOS mobile phone), a tablet computer, a palmtop computer, or a notebook computer of the user, but is not limited thereto. The target object may be a target of interest to a user in the video data, for example, a person or a vehicle. That is, the target object may be a target that satisfies a particular condition and that is determined according to requirements of the user, for example, a male target or a target of purchasing designated goods, but this is not limited thereto.

To accurately determine the target object from the original video data and to enable the user to input the object information of the target object, the object information may include: a target attribute and a target time period. The target attribute may include an attribute of the target object, for example, gender, age, height, or garment, and may alternatively include a particular operation performed by the target object, for example, purchasing designated goods in an off-line shopping scenario, but this is not limited thereto. The target time period may be an acquisition time of video data that the user needs to browse, for example, 24 hours, but is not limited thereto.

In Step S1406, the method includes obtaining a target image sequence corresponding to the target object from the original video data.

The target image sequence in the foregoing step may be images of the target object acquired in different frames of images in the video data in the target time period. All the images of the target object may be sorted according to the acquisition time. To facilitate the user to accurately learn a time point at which the image is acquired, a timestamp may be labeled on each image.

In Step S1408, the method includes displaying the target image sequence in a fade-in and fade-out manner.

In an exemplary embodiment, each image in the target image sequence may be displayed successively in chronological order, and each image is displayed in a fade-in and fade-out manner. Therefore, the user may see the target object moving on the screen and finally disappearing, making it more intuitive for the user to determine a movement track of the target object.

According to the solution provided in the foregoing embodiments of this specification, after the original video data and the target object inputted by the client are obtained, the target image sequence corresponding to the target object may be obtained from the original video data, and the target image sequence is displayed in a fade-in and fade-out manner, thereby implementing video condensation. It is easy to notice that, by extracting a target image sequence and displaying in a fade-in and fade-out manner, redundant information in an original video is removed, and only a target of interest to a user is retained in the video, thereby reducing a length of a long-duration video, reducing storage costs, and improving efficiency of obtaining effective information by the user, further resolving a technical problem that a target object cannot be identified quickly due to a large amount of stored video data and a large amount of redundant information in the related art.

In the foregoing embodiments of this specification, the processing the original video data based on the object information of the target object, to obtain a target image sequence of the target object includes: processing the original video data, to obtain a segmentation mask of at least one detection object; processing the original video data by using the segmentation mask of the at least one detection object, to obtain an image sequence of the at least one detection object; and determining the target image sequence based on the object information of the target object.

In the foregoing embodiments of this specification, the processing the original video data to obtain a segmentation mask of at least one detection object includes: processing the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In the foregoing embodiments of this specification, the determining the target image sequence based on the object information of the target object includes: recognizing the image sequence of the at least one detection object, to determine attribute information of the at least one detection object; matching the target attribute of the target object with the attribute information of the at least one detection object, to determine an image sequence of the target object; and obtaining an image sequence in the target time period from the image sequence of the target object, to obtain the target image sequence.

Embodiment 10

An embodiment of this specification may further provide a computer terminal, and the computer terminal may be any computer terminal device in a computer terminal cluster. In some embodiments, the foregoing computer terminal may be replaced with a terminal device such as a mobile terminal.

In some embodiments, the foregoing computer terminal may be located in at least one of a plurality of network devices in a computer network.

In this embodiment, the computer terminal may execute program code of the following steps in the data processing method: obtaining original video data and object information of a target object; processing the original video data based on the object information of the target object, to obtain a target image sequence of the target object; processing the original video data, to obtain a background image, where the background image is included in the original video data and does not include a detection object; and synthesizing the target image sequence and the background image, to obtain target video data.

Figure 15:
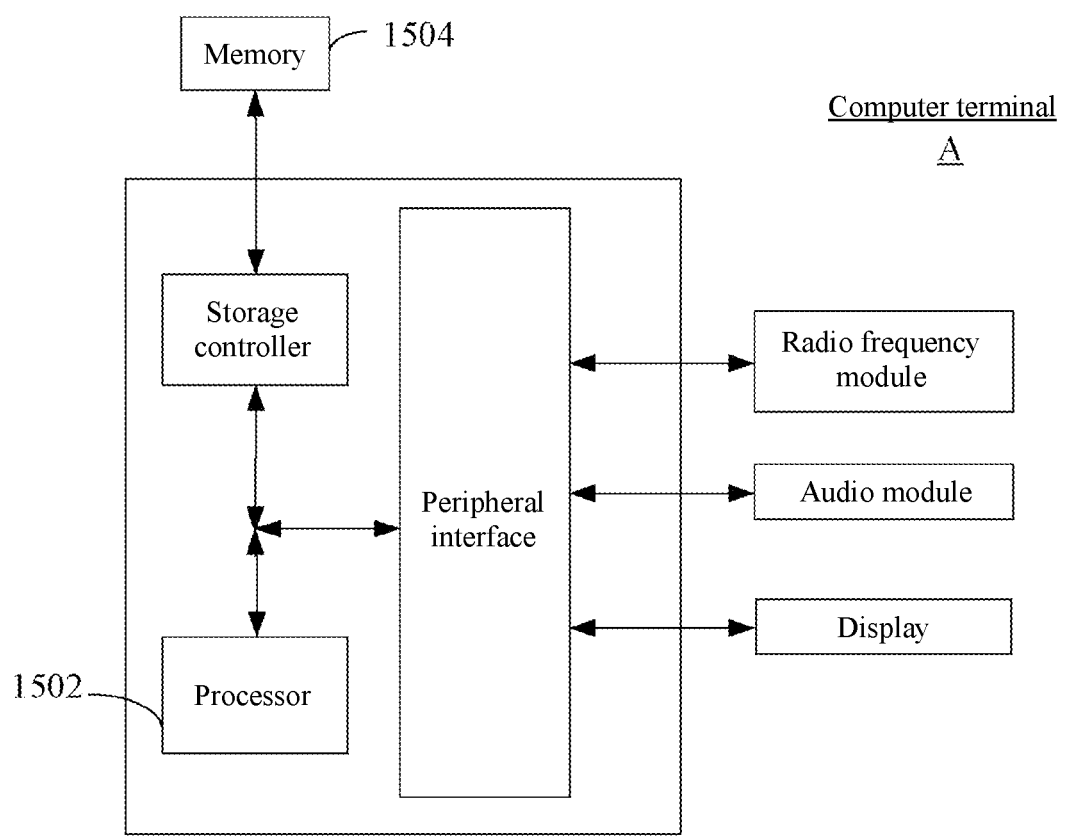
FIG. 15 is a structural block diagram of a computer terminal, according to an embodiment of this specification.

In some embodiments, FIG. 15 is a structural block diagram of a computer terminal according to an embodiment of this specification. As shown in FIG. 15, the computer terminal A may include: one or more (only one is shown in the figure) processors 1502 and a memory 1504.

The memory may be configured to store a software program and a module, for example, a program instruction/module corresponding to the data processing method and apparatus in the embodiments of this specification. The processor runs the software program and the module stored in the memory, to implement various functional applications and data processing, that is, implement the foregoing data processing method. The memory may include a high-speed random access memory, and may also include a non-volatile memory, for example, one or more magnetic storage apparatuses, flash memories, or other non-volatile solid-state memories. In some embodiments, the memory may further include memories remotely disposed relative to the processor, and these remote memories may be connected to the terminal A through a network. An example of the foregoing network includes, but is not limited to, the Internet, an intranet, a local area network, a mobile communication network, and a combination thereof.

The processor may call, by using the transmission apparatus, the information and the application program that are stored in the memory, to perform the following steps: obtaining original video data and object information of a target object; processing the original video data based on the object information of the target object, to obtain a target image sequence of the target object; processing the original video data, to obtain a background image, where the background image is included in the original video data and does not include a detection object; and synthesizing the target image sequence and the background image, to obtain target video data.

In some embodiments, the foregoing processor may further execute program code of the following steps: processing the original video data, to obtain a segmentation mask of at least one detection object; processing the original video data by using the segmentation mask of the at least one detection object, to obtain an image sequence of the at least one detection object; and determining the target image sequence based on the object information of the target object.

In some embodiments, the foregoing processor may further execute program code of the following steps: detecting the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In some embodiments, the object information includes at least a target attribute and a target time period, and the foregoing processor may further execute program code of the following steps: recognizing the image sequence of the at least one detection object, to determine attribute information of the at least one detection object; matching the target attribute of the target object with the attribute information of the at least one detection object, to determine an image sequence of the target object; and obtaining an image sequence in the target time period from the image sequence of the target object, to obtain the target image sequence.

In some embodiments, the foregoing processor may further execute program code of the following steps: determining a target location of the target image sequence in the target video data based on a preset video synthesis rule; and synthesizing the target image sequence and the background image based on the target location, to obtain the target video data.

In some embodiments, the foregoing processor may further execute program code of the following steps: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

The processor may call, by using the transmission apparatus, the information and the application program that are stored in the memory, to perform the following steps: obtaining object information of a target object; matching the object information of the target object with a pre-stored image sequence of at least one detection object, to obtain a target image sequence of the target object, where the image sequence of the at least one detection object is obtained by processing original video data; and synthesizing the target image sequence and a background image, to obtain target video data, where the background image is included in the original video data and does not include a detection object.

In some embodiments, the foregoing processor may further execute program code of the following steps: processing the original video data, to obtain a segmentation mask of at least one detection object; processing the original video data by using the segmentation mask of the at least one detection object, to obtain an image sequence of the at least one detection object; and recognizing the image sequence of the at least one detection object, to determine attribute information of the at least one detection object; and storing the image sequence and the attribute information of the at least one detection object.

In some embodiments, the foregoing processor may further execute program code of the following steps: matching the target attribute of the target object with the attribute information of the at least one detection object, to determine an image sequence of the target object; and obtaining an image sequence in the target time period from the image sequence of the target object, to obtain the target image sequence.

The processor may call, by using the transmission apparatus, the information and the application program that are stored in the memory, to execute the following steps: displaying original video data and object information of a target object; and displaying target video data, where the target video data is obtained by synthesizing a target image sequence of the target object and a background image in the original video data, the target image sequence is obtained by processing the original video data based on the object information of the target object, and the background image is included in the original video data and does not include a detection object.

In some embodiments, the foregoing processor may further execute program code of the following steps: displaying the target image sequence and/or an acquisition time of the target image sequence in the target video data in a preset manner.

The processor may call, by using the transmission apparatus, the information and the application program that are stored in the memory, to perform the following steps: displaying object information of a target object; and displaying target video data, where the target video data is obtained by synthesizing a target image sequence of the target object and a background image in original video data, the target image sequence is obtained by matching the object information of the target object with a pre-stored image sequence of at least one detection object, and the background image is included in the original video data and does not include a detection object.

By using this embodiment of this specification, a data processing solution is provided. By extracting a target image sequence and synthesizing the target image sequence with a background image, redundant information in an original video is removed, and only a target of interest to a user is retained in the video, thereby reducing a length of a long-duration video, reducing storage costs, and improving efficiency of obtaining effective information by the user, further resolving a technical problem that a target object cannot be identified quickly due to a large amount of stored video data and a large amount of redundant information in the related art.

The processor may call, by using the transmission apparatus, the information and the application program that are stored in the memory, to perform the following steps: obtaining original video data; receiving a target object inputted by a client; obtaining a target image sequence corresponding to the target object from the original video data; and displaying the target image sequence in a fade-in and fade-out manner.

A person of ordinary skill in the art may understand that the structure shown in FIG. 15 is merely an example, and the computer terminal may be a terminal device such as a smartphone (for example, an Android mobile phone or an iOS mobile phone), a tablet computer, a palmtop computer, a mobile Internet device (MID), and a PAD. FIG. 15 does not constitute a limitation on a structure of the foregoing electronic apparatus. For example, the computer terminal A may further include more or fewer components (for example, a network interface and a display apparatus) than those shown in FIG. 15, or have a configuration different with that shown in FIG. 15.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

Embodiment 11

An embodiment of this specification further provides a storage medium. In some embodiments, the storage medium may be configured to store program code executed in the data processing method provided in the foregoing embodiments.

In some embodiments, the storage medium may be located in any computer terminal in a computer terminal cluster in a computer network, or in any mobile terminal in a mobile terminal cluster.

In some embodiments, the storage medium is configured to store program code used for performing the following steps: obtaining original video data and object information of a target object; processing the original video data based on the object information of the target object, to obtain a target image sequence of the target object; processing the original video data, to obtain a background image, where the background image is included in the original video data and does not include a detection object; and synthesizing the target image sequence and the background image, to obtain target video data.

In some embodiments, the storage medium is further configured to store program code used for performing the following steps: processing the original video data, to obtain a segmentation mask of at least one detection object; processing the original video data by using the segmentation mask of the at least one detection object, to obtain an image sequence of the at least one detection object; and determining the target image sequence based on the object information of the target object.

In some embodiments, the storage medium is further configured to store program code used for performing the following steps: detecting the original video data, to obtain at least one segmentation mask; processing the at least one segmentation mask by using a tracing algorithm, to obtain identification information of the at least one segmentation mask, where segmentation masks corresponding to the same identification information are masks of the same detection object; and obtaining the segmentation mask of the at least one detection object based on the identification information of the at least one segmentation mask.

In some embodiments, the object information includes at least a target attribute and a target time period, and the storage medium is further configured to store program code used for performing the following steps: recognizing the image sequence of the at least one detection object, to determine attribute information of the at least one detection object; matching the target attribute of the target object with the attribute information of the at least one detection object, to determine an image sequence of the target object; and obtaining an image sequence in the target time period from the image sequence of the target object, to obtain the target image sequence.

In some embodiments, the storage medium is further configured to store program code used for performing the following steps: determining a target location of the target image sequence in the target video data based on a preset video synthesis rule; and synthesizing the target image sequence and the background image based on the target location, to obtain the target video data.

In some embodiments, the storage medium is further configured to store program code used for performing the following steps: determining a length of the target video data based on a length of the target image sequence, and determining a first location of the target image sequence in the target video data; obtaining a loss value of the first location based on the preset video synthesis rule; determining, when the loss value of the first location is greater than a preset value, a second location of the target image sequence in the target video data, and using the second location as the first location until the loss value of the first location is less than the preset value; and determining the first location as the target location when the loss value of the first location is less than the preset value.

The processor may call, by using the transmission apparatus, the information and the application program that are stored in the memory, to perform the following steps: obtaining object information of a target object; matching the object information of the target object with a pre-stored image sequence of at least one detection object, to obtain a target image sequence of the target object, where the image sequence of the at least one detection object is obtained by processing original video data; and synthesizing the target image sequence and a background image, to obtain target video data, where the background image is included in the original video data and does not include a detection object.

In some embodiments, the storage medium is further configured to store program code used for performing the following steps: processing the original video data, to obtain a segmentation mask of at least one detection object; processing the original video data by using the segmentation mask of the at least one detection object, to obtain an image sequence of the at least one detection object; recognizing the image sequence of the at least one detection object, to determine attribute information of the at least one detection object; and storing the image sequence and the attribute information of the at least one detection object.

In some embodiments, the storage medium is further configured to store program code used for performing the following steps: matching the target attribute of the target object with the attribute information of the at least one detection object, to determine an image sequence of the target object; and obtaining an image sequence in the target time period from the image sequence of the target object, to obtain the target image sequence.

In some embodiments, in this embodiment, the storage medium is configured to store program code used for performing the following steps: displaying original video data and object information of a target object; and displaying target video data, where the target video data is obtained by synthesizing a target image sequence of the target object and a background image in the original video data, the target image sequence is obtained by processing the original video data based on the object information of the target object, and the background image is included in the original video data and does not include a detection object.

In some embodiments, the storage medium is configured to store program code used for performing the following steps: displaying the target image sequence and/or an acquisition time of the target image sequence in the target video data in a preset manner.

In some embodiments, in this embodiment, the storage medium is configured to store program code used for performing the following steps: displaying object information of a target object; and displaying target video data, where the target video data is obtained by synthesizing a target image sequence of the target object and a background image in original video data, the target image sequence is obtained by matching the object information of the target object with a pre-stored image sequence of at least one detection object, and the background image is included in the original video data and does not include a detection object.

In some embodiments, the storage medium is configured to store program code used for performing the following steps: obtaining original video data; receiving a target object inputted by a client; obtaining a target image sequence corresponding to the target object from the original video data; and displaying the target image sequence in a fade-in and fade-out manner.

The sequence numbers of the foregoing embodiments of this specification are merely for description purpose but do not indicate the preference among the embodiments.

In the foregoing embodiments of this specification, the descriptions of the embodiments have respective focuses. For a part that is not described in detail in an embodiment, refer to related descriptions in other embodiments.

In the several embodiments provided in this specification, it should be understood that the disclosed technical content may be implemented in other manners. The foregoing described apparatus embodiments are merely examples. For example, the unit division is merely logical function division and there may be other division manners in actual implementation. For example, multiple units or components may be combined or integrated into another system, or some features may be omitted or not performed. In addition, the coupling, or direct coupling, or communication connection between the displayed or discussed components may be the indirect coupling or communication connection through some interfaces, units, or modules, and can be in electrical or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this specification may be integrated into one processing unit, or each of the units can exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this specification essentially, or the part contributing to the existing technologies, or the entire or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this specification. The above storage medium includes any medium that can store program code, such as a USB flash disk, a ROM, a RAM, a removable hard disk, a magnetic disk, or an optical disc.

The foregoing descriptions are exemplary implementations of this specification. A person of ordinary skill in the art may make several improvements and refinements without departing from the principle of this specification, and the improvements and refinements shall fall within the protection scope of this specification.

What is claimed is:

1. A data processing method, comprising:
   obtaining video data;
   receiving a target object description of a target object;
   obtaining one or more first images from the video data by matching a plurality of target object candidates with the target object description as a target image sequence, wherein the one or more first images each comprises an image of the target object;
   processing the video data to obtain one or more second images of the video data that do not contain the image of the target object;
   generating a background image based on the one or more second images;
   determining a target location of the target image sequence in the video data with an iterative process comprising:
      determining a first location of the target image sequence in the video data;
      computing a loss value for the first location of the target image sequence in the video data by increasing the loss value when the target object is blocked in the video data at the first location, and decreasing the loss value when an interactive relationship involving the target object is maintained in the video data at the first location; and
      in response to the loss value for the first location being greater than a threshold value, determining a second location of the target image sequence in the video data and using the second location as the first location to compute the loss value until the loss value is less than the threshold value;
   synthesizing the target image sequence with the background image based on the target location to generate a target video data;
   and
   displaying the target video data.

2. The method according to claim 1, wherein the obtaining one or more first images from the video data comprises:
   obtaining a third image of the video data that matches with the target object description and includes the image of the target object;
   carving out the image of the target object from the third image to generate a segmentation mask; and
   using the segmentation mask to obtain the one or more first images of the video data that contain the image of the target object.

3. The method according to claim 2, further comprising:
   periodically obtaining a segmentation mask by processing the video data to obtain a plurality of segmentation masks; and
   using a tracing algorithm to obtain identification information of the segmentation masks, wherein segmentation masks corresponding to a same identification information are masks for a same object in the video.

4. The method according to claim 1, wherein the obtaining one or more first images of the video data comprises:
   processing the video data based on a target attribute of the target object and a target time period, by:
   determining attribute information of an object in the one or more first images;
   matching the target attribute of the target object with the attribute information of the object in the one or more first images to determine an image sequence of the target object; and
   obtaining an image sequence in the target time period from the image sequence of the target object to obtain the target image sequence.

5. The method according to claim 1, wherein each image of the video data is given a time stamp, wherein the synthesizing the target image sequence with the background image based on the target location to generate a target video data comprises:
   synthesizing the one or more first images onto the background image to generate one synthesized image.

6. The method according to claim 5, wherein the synthesizing one or more first images onto the background image to generate one synthesized image comprises:
   including time stamps of the one or more first images in the background image to generate the one synthesized image.

7. The method according to claim 1, wherein the target object is a first target object, wherein the method further comprises:
   receiving a second target object different from the first target object; and
   processing the video data to obtain one or more fourth images of the video data that contain an image of the second target object, wherein the one or more synthesized images are obtained by: synthesizing one of the one or more first images and one of the one or more fourth images onto the background image.

8. The method according to claim 7, wherein the synthesizing one of the one or more first images and one of the one or more fourth images onto the background image comprises:
   synthesizing one of the one or more first images and one of the one or more fourth images onto the background image such that the image of the first target object does not overlap the image of the second target object.

9. An apparatus, comprising:
   one or more processors; and
   a memory storing instructions executable by the one or more processors to cause the one or more processors to perform operations comprising:
   obtaining video data;
   receiving a target object description of a target object;
   obtaining one or more first images from the video data by matching a plurality of target object candidates with the target object description as a target image sequence, wherein the one or more first images each comprises an image of the target object;
   processing the video data to obtain one or more second images of the video data that do not contain the image of the target object;
   generating a background image based on the one or more second images;
   determining a target location of the target image sequence in the video data with an iterative process comprising:
      determining a first location of the target image sequence in the video data;
      computing a loss value for the first location of the target image sequence in the video data by increasing the loss value when the target object is blocked in the video data at the first location, and decreasing the loss value when an interactive relationship involving the target object is maintained in the video data at the first location; and
      in response to the loss value for the first location being greater than a threshold value, determining a second location of the target image sequence in the video data and using the second location as the first location to compute the loss value until the loss value is less than the threshold value;
   synthesizing the target image sequence with the background image based on the target location to generate a target video data;
   and
   displaying the target video data.

10. The apparatus according to claim 9, wherein the obtaining one or more first images from the video data comprises:
   obtaining a third image of the video data that matches with the target object description and includes the image of the target object;
   carving out the image of the target object from the third image to generate a segmentation mask; and
   using the segmentation mask to obtain the one or more first images of the video data that contain the image of the target object.

11. The apparatus according to claim 10, wherein the operations further comprise:
   periodically obtaining a segmentation mask by processing the video data to obtain a plurality of segmentation masks; and
   using a tracing algorithm to obtain identification information of the segmentation masks, wherein segmentation masks corresponding to a same identification information are masks for a same object in the video.

12. The apparatus according to claim 9, wherein the obtaining one or more first images of the video data comprises:
   processing the video data based on a target attribute of the target object and a target time period, by:
      determining attribute information of an object in the one or more first images;
      matching the target attribute of the target object with the attribute information of the object in the one or more first images to determine an image sequence of the target object; and
      obtaining an image sequence in the target time period from the image sequence of the target object to obtain the target image sequence.

13. The apparatus according to claim 9, wherein each image of the video data is given a time stamp, wherein the synthesizing the target image sequence with the background image based on the target location to generate a target video data comprises:
   synthesizing the one or more first images onto the background image to generate one synthesized image.

14. The apparatus according to claim 13, wherein the synthesizing the one or more first images onto the background image to generate one synthesized image comprises:
   including time stamps of the one or more first images in the background image to generate the one synthesized image.

15. The apparatus according to claim 9, wherein the target object is a first target object, wherein the operations further comprise:
   receiving a second target object different from the first target object; and
   processing the video data to obtain one or more fourth images of the video data that contain an image of the second target object, wherein the one or more synthesized images are obtained by: synthesizing one of the one or more first images and one of the one or more fourth images onto the background image.

16. The apparatus according to claim 15, wherein the synthesizing one of the one or more first images and one of the one or more fourth images onto the background image comprises:
   synthesizing one of the one or more first images and one of the one or more fourth images onto the background image such that the image of the first target object does not overlap the image of the second target object.

17. One or more non-transitory computer-readable storage media configured with instructions executable by one or more processors to cause the one or more processors to perform operations comprising:
   obtaining video data;
   receiving a target object description of a target object;
   obtaining one or more first images from the video data by matching a plurality of target object candidates with the target object description as a target image sequence, wherein the one or more first images each comprises an image of the target object;

processing the video data to obtain one or more second images of the video data that do not contain the image of the target object;

generating a background image based on the one or more second images;

determining a target location of the target image sequence in the video data with an iterative process comprising:
 determining a first location of the target image sequence in the video data;
 computing a loss value for the first location of the target image sequence in the video data by increasing the loss value when the target object is blocked in the video data at the first location, and decreasing the loss value when an interactive relationship involving the target object is maintained in the video data at the first location; and
 in response to the loss value for the first location being greater than a threshold value, determining a second location of the target image sequence in the video data and using the second location as the first location to compute the loss value until the loss value is less than the threshold value;

synthesizing the target image sequence with the background image based on the target location to generate a target video data; and displaying the target video data.

18. The one or more non-transitory computer-readable storage media according to claim 17, wherein each image of the video data is given a time stamp, wherein the synthesizing the target image sequence with the background image based on the target location to generate a target video data comprises:

synthesizing the one or more first images onto the background image to generate one synthesized image.

19. The one or more non-transitory computer-readable storage media according to claim 18, wherein the synthesizing the one or more first images onto the background image to generate one synthesized image comprises:

including time stamps of the one or more first images in the background image to generate the one synthesized image.

20. The one or more non-transitory computer-readable storage media according to claim 17, wherein the target object is a first target object, wherein the operations further comprise:

receiving a second target object different from the first target object; and processing the video data to obtain one or more fourth images of the video data that contain an image of the second target object, wherein the one or more synthesized images are obtained by: synthesizing one of the one or more first images and one of the one or more fourth images onto the background image.

* * * * *